US010605521B2

(12) United States Patent
Yun et al.

(10) Patent No.: US 10,605,521 B2
(45) Date of Patent: *Mar. 31, 2020

(54) AIR PURIFIER FOR REFRIGERATOR

(71) Applicant: LG ELECTRONICS INC., Seoul (KR)

(72) Inventors: Jongho Yun, Seoul (KR); Hyungyul Kim, Seoul (KR); Hyunsik Mun, Seoul (KR); Wooyong Ju, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,623

(22) Filed: Feb. 22, 2019

(65) Prior Publication Data

US 2019/0186811 A1 Jun. 20, 2019

Related U.S. Application Data

(63) Continuation of application No. 15/432,021, filed on Feb. 14, 2017, now Pat. No. 10,254,035.

(30) Foreign Application Priority Data

Feb. 16, 2016 (KR) ........................ 10-2016-0017583

(51) Int. Cl.
  *B01D 46/46* (2006.01)
  *B01D 46/10* (2006.01)
  (Continued)

(52) U.S. Cl.
  CPC .............. *F25D 23/12* (2013.01); *F25D 11/02* (2013.01); *F25D 17/04* (2013.01); *F25D 17/042* (2013.01);
  (Continued)

(58) Field of Classification Search
  CPC ............ B01D 46/0006; B01D 46/0045; B01D 46/4227; B01D 46/0023; B01D 46/46;
  (Continued)

(56) References Cited

U.S. PATENT DOCUMENTS 10,254,035 B2 * 4/2019 Yun ........................ F25D 23/12
2005/0284113 A1 12/2005 Jang et al.
(Continued)

FOREIGN PATENT DOCUMENTS

CN 1740678 3/2006
CN 1837726 9/2006
(Continued)

OTHER PUBLICATIONS

Chinese Office Action (with English translation) dated Jul. 19, 2019 issued in CN Application No. 201710069215.2.
(Continued)

*Primary Examiner* — Minh Chau T Pham
(74) *Attorney, Agent, or Firm* — Ked & Associates LLP

(57) ABSTRACT

A refrigerator and an air purifier for a refrigerator are provided. The air purifier may include a case configured to be mounted on an upper surface of a cabinet of a refrigerator and in which inlet holes and an outlet hole are formed, a plurality of fan motor assemblies provided inside of the case to force a flow of air, a plurality of filter assemblies mounted in the case to partition a space between the inlet holes and the plurality of fan motor assemblies and purify suctioned air, a controller that controls driving of the plurality of fan motor assemblies, and a gas sensor connected to the controller to detect harmful gas in a kitchen space. The controller may control driving of the plurality of fan motor assemblies through detection of the harmful gas by the gas sensor.

17 Claims, 18 Drawing Sheets

(51) Int. Cl.
*F25D 11/02* (2006.01)
*F25D 23/12* (2006.01)
*F25D 17/04* (2006.01)
*F24F 13/26* (2006.01)
*F25D 17/06* (2006.01)
*F25D 29/00* (2006.01)
*B01D 46/00* (2006.01)

(52) U.S. Cl.
CPC ......... *F25D 17/062* (2013.01); *F25D 29/006* (2013.01); *B01D 46/0006* (2013.01); *B01D 46/0023* (2013.01); *B01D 46/10* (2013.01); *F25D 2317/041* (2013.01); *F25D 2400/361* (2013.01)

(58) Field of Classification Search
CPC ... B01D 46/10; B01D 2267/40; F25D 17/042; F25D 11/02; F25D 17/0062; F25D 29/006; F25D 23/12; F25D 17/04; F25D 2317/041; F25D 2400/361; F24F 3/1603; F24F 13/28; F24F 2221/18
USPC .............. 55/385.1, 472, 473, 471, 487, 493; 95/25, 26; 96/397, 417, 422, 424; 62/78, 62/314, 331, 440, 441
See application file for complete search history.

(56) References Cited

U.S. PATENT DOCUMENTS

| | | |
|---|---|---|
| 2013/0015753 A1 | 1/2013 | Son |
| 2013/0036755 A1* | 2/2013 | Kang .................. B01L 1/50 62/129 |
| 2015/0377791 A1* | 12/2015 | Jung .................... G01N 31/221 436/55 |
| 2016/0245543 A1 | 8/2016 | Saiki |
| 2017/0186751 A1* | 6/2017 | Akasawa .......... H01L 27/10805 |
| 2017/0234598 A1* | 8/2017 | Yun ...................... F25D 23/12 96/397 |
| 2018/0023821 A1 | 1/2018 | Kim |
| 2018/0238846 A1* | 8/2018 | Shim .................... G01N 27/124 |

FOREIGN PATENT DOCUMENTS

| | | |
|---|---|---|
| CN | 1862161 | 11/2006 |
| CN | 1955626 | 5/2007 |
| CN | 101484767 | 7/2009 |
| CN | 204423247 | 6/2015 |
| DE | 694 16 264 | 8/1999 |
| GB | 2 415 398 | 12/2005 |
| JP | S 63-162015 | 7/1988 |
| JP | H 01-254225 | 10/1989 |
| JP | H 05-8379 | 2/1993 |
| JP | H 08-32248 | 2/1996 |
| JP | 2003-247773 | 9/2003 |
| JP | 2006-023075 | 1/2006 |
| JP | 2007-120877 | 5/2007 |
| JP | 2007-268096 | 10/2007 |
| JP | 2007-292433 | 11/2007 |
| JP | 2007-322090 | 12/2007 |
| JP | 2008-006184 | 1/2008 |
| JP | 2010-089043 | 4/2010 |
| KR | 20-1993-0015196 | 7/1993 |
| KR | 10-2005-0069321 | 7/2005 |
| KR | 10-2005-0122761 | 12/2005 |
| KR | 10-2006-0010106 | 2/2006 |
| KR | 10-2006-0014144 | 2/2006 |
| KR | 10-2006-0019655 | 3/2006 |
| KR | 10-0797154 | 1/2008 |

OTHER PUBLICATIONS

Korean Office Action dated Apr. 3, 2017 issued in Application No. 10-2016-0017583.
European Search Report dated May 18, 2017 issued in Application No. 17155423.1.
Korean Office Action dated Oct. 23, 2017.
Japanese Office Action dated Jan. 23, 2018 issued in Application No. 2017-023719.
Japanese Notice of Allowance dated Sep. 11, 2018 issued in Application No. 2017-023719.
Chinese Office Action dated Feb. 3, 2019.
U.S. Office Action issued in U.S. Appl. No. 15/432,021 dated Aug. 2, 2018.
U.S. Notice of Allowance issued in U.S. Appl. No. 15/432,021 dated Nov. 21, 2018.

* cited by examiner

AIR PURIFIER FOR REFRIGERATOR

CROSS-REFERENCE TO RELATED APPLICATIONS

This application is a Continuation Application of prior U.S. patent application Ser. No. 15/432,021 filed Feb. 14, 2017, now U.S. Pat. No. 10,254,035, which claims priority under 35 U.S.C. § 119 to Korean Application No. 10-2016-0017583 filed on Feb. 16, 2016, whose entire disclosures are hereby incorporated by reference.

BACKGROUND

1. Field

An air purifier for a refrigerator is disclosed herein.

2. Background

In general, a refrigerator refers to a home appliance in which food or other items may be stored in an internal storage space shielded by doors. To achieve this, the refrigerator is configured to accommodate stored food in an optimum state by cooling the internal storage space using cold air generated through heat exchange with a refrigerant which circulates in a freezing cycle.

The refrigerator may be classified into various forms based on an arrangement of storage spaces within the refrigerator, such as refrigerating chambers and freezing chambers. Further, the refrigerator may have various structures and devices provided therein to improve use convenience of a user.

In recent years, a refrigerator in which an air purifier that purifies indoor air is mounted has been developed. Korean Patent No. 10-0797154, which is hereby incorporated by reference, discloses an air purifier for a refrigerator, which is detachably mounted on an upper surface of a refrigerator such that air is suctioned from opposite sides thereof through rotation of a fan and is purified by a filter unit, and the purified air is then discharged to a front side thereof.

The refrigerator having such a structure according to the related art has the following problems.

First, the conventional air purifier which is mounted on a fixedly installed refrigerator may purify only air within a limited space so that air in a kitchen space in which the refrigerator is installed may not be sufficiently purified.

Second, the conventional air purifier uses a cross flow type fan for a compact structure. In this structure, there is a problem in that because a suctioned air volume and a discharged air volume are low, an air purifying effect is low.

Finally, filters that constitute the filter unit of the conventional air purifier include an antibacterial filter, a deodorization filter, and a dust collection filter. However, the above-described configuration corresponds to a structure of a general air purifier, which is not specialized for a kitchen environment, and thus, is not effective in purifying air in a kitchen.

BRIEF DESCRIPTION OF THE DRAWINGS

Embodiments will be described in detail with reference to the following drawings in which like reference numerals refer to like elements, and wherein.

DETAILED DESCRIPTION

Hereinafter, exemplary embodiments will be described in detail with reference to the accompanying drawings. However, the embodiments may, however, be embodied in many different forms and should not be construed as being limited to the embodiments set forth herein; rather, alternative embodiments included in other retrogressive inventions or falling within the spirit and scope can easily be derived through adding, altering, and removing, and will fully convey the concept to those skilled in the art.

Figure 1:
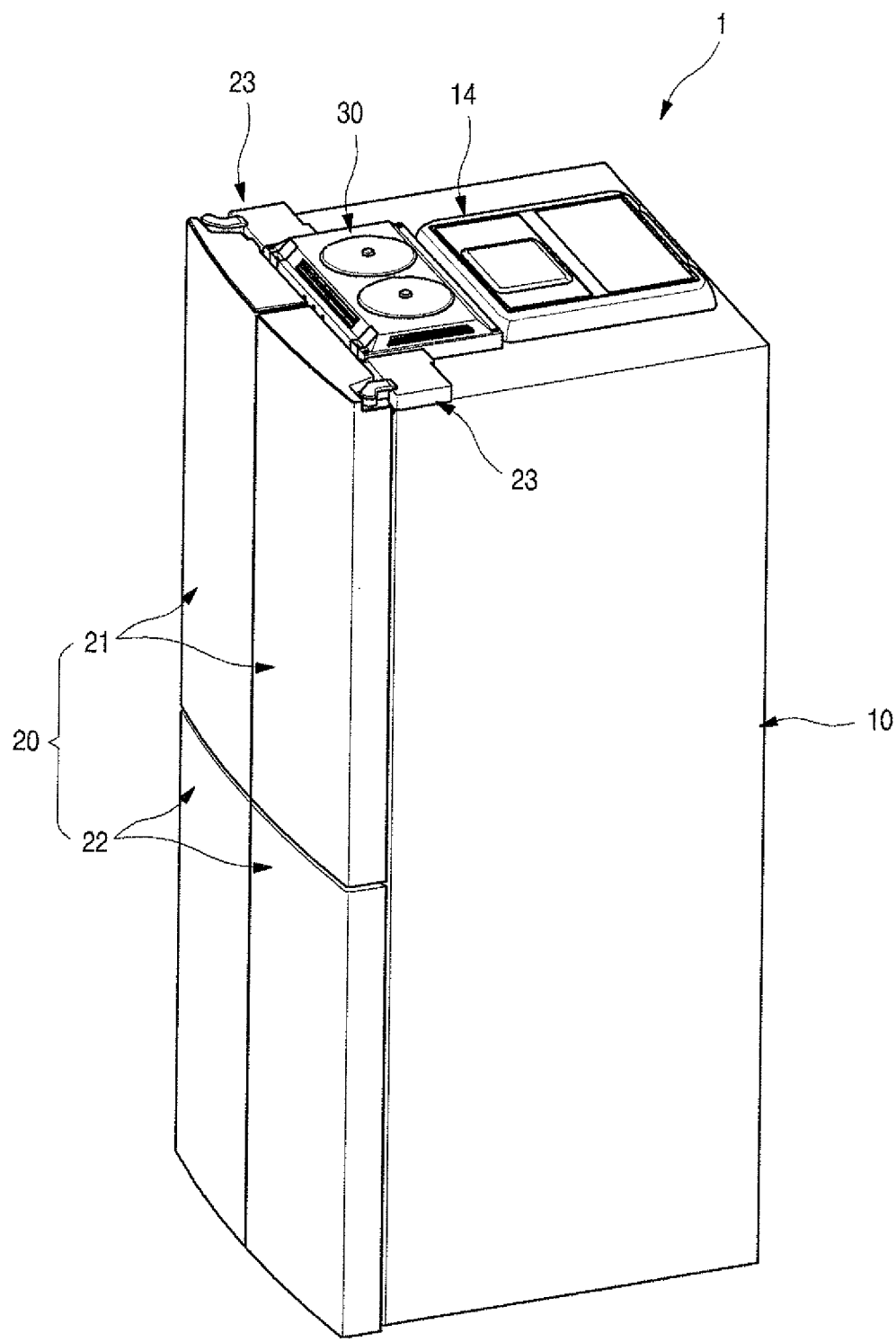
FIG. 1 is a perspective view of a refrigerator according to an embodiment.
Figure 2:
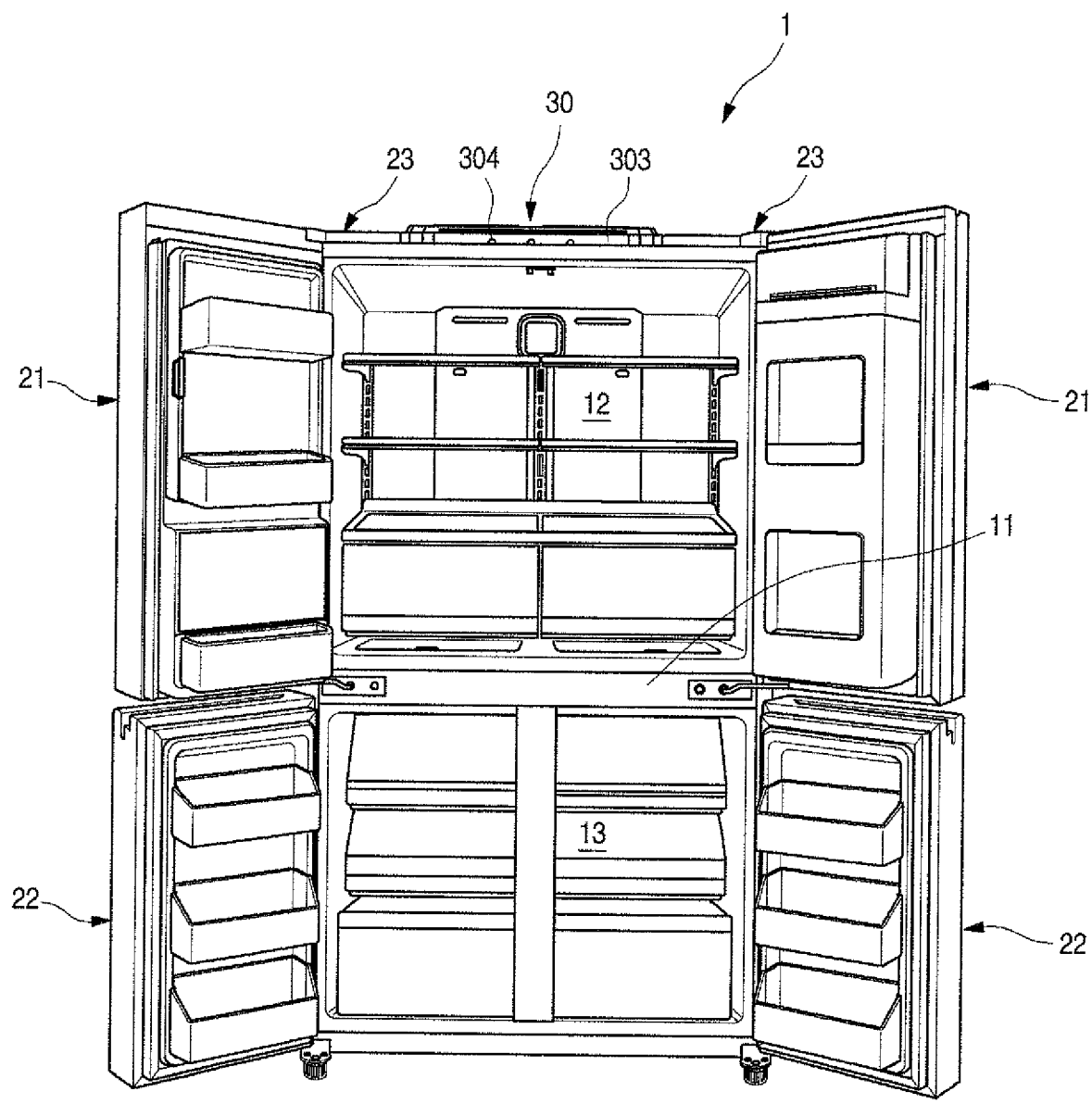
FIG. 2 is a front view illustrating a state in which a door of the refrigerator of FIG. 1 is opened.

FIG. 1 is a perspective view of a refrigerator according to an embodiment. FIG. 2 is a front view illustrating a state in which a door of the refrigerator of FIG. 1 is opened.

As illustrated in the drawings, an outer appearance of a refrigerator 1 according to an embodiment may be defined by a cabinet 10 that defines a storage space and doors 20 mounted on the cabinet 10 to open and close the storage space. The storage space within the cabinet 10 may be vertically partitioned by a barrier 11, and may have a refrigerating chamber 12 on or at an upper side thereof and a freezing chamber 13 on or at a lower side thereof. Further, a space of the refrigerator chamber 13 may be further horizontally partitioned. A plurality of shelves and drawers may be provided inside of the refrigerating chamber 12 and the freezing chamber 13 so that food may be accommodated therein in accordance with usage thereof.

The doors 20 may include refrigerating chamber doors 21 that open/close the refrigerating chamber 12 and freezing chamber doors 22 that open and close the freezing chamber 13. The refrigerating chamber doors 21 may be rotatably mounted by hinges 23 provided on opposite sides of an upper surface of the cabinet 10. Thus, the refrigerating chamber 12 may be entirely or partially opened by the pair of refrigerating chamber doors 21.

The pair of freezing chamber doors 22 may be also provided on opposite lateral (left and right in the drawings) sides to be independently rotated. The pair of freezing chamber doors 22 may open and close the partitioned space of the freezing chamber 13. A plurality of door baskets may be provided on or at rear surfaces of the refrigerating chamber doors 21 and the freezing chamber doors 22 to provide accommodation spaces for food.

In this embodiment, a bottom freezer refrigerator is illustratively described for convenience of description and understanding; however, a form and structure of the refrigerator are not limited thereto.

A main control unit or controller 14 that controls driving of the refrigerator 1 may be formed or provided on or at an upper surface of the cabinet 10. The main controller 14 may protrude upward from a center of an upper surface of the refrigerator 1. Further, a main PCB that controls driving of the refrigerator 1 may be provided in the main controller 14.

An air purifier 30 may be provided on an upper surface of the cabinet 10. The air purifier 30, which is for purifying air in a kitchen space in which the refrigerator 1 is arranged or provided, may be provided on the upper surface of the cabinet 10.

The air purifier 30 may be arranged in a space between the main controller 14, the refrigerating chamber doors 21, and the hinges 23, and may have a structure in which air is suctioned in from opposite sides thereof, purified therein, and then discharged to a front side thereof. A rear end of the air purifier 30 may contact a front end of the main controller 14 so that the air cannot be introduced from or discharged to a rear side of the air purifier 30 at which the main controller 14 is arranged.

A front surface of the air purifier 30 may be shielded by the refrigerating chamber doors 21. Upper ends of the refrigerating chamber doors 21 may extend to be identical in height to or higher than a height of the air purifier 30. Thus, in a state in which the refrigerating chamber doors 21 are closed, the air purifier 30 may be covered by the refrigerating chamber doors 21 such that the air purifier 30 is not exposed when viewed from a front side. That is, a height of the air purifier 30 may be lower than the upper ends of the refrigerating chamber doors 21.

In a state in which the refrigerating chamber doors 21 are opened, the front surface of the air purifier 30 may be exposed. Further, a display 303 and a manipulation button 304 may be provided on the front surface of the air purifier 30. Thus, in a state in which the refrigerating chamber doors 21 are opened, the display 303 may display an operation state of the air purifier 30 and various pieces of information related to an operation of purifying air. Further, an operation of the air purifier 30 may be set and manipulated by manipulating the manipulation button 304.

Figure 3:
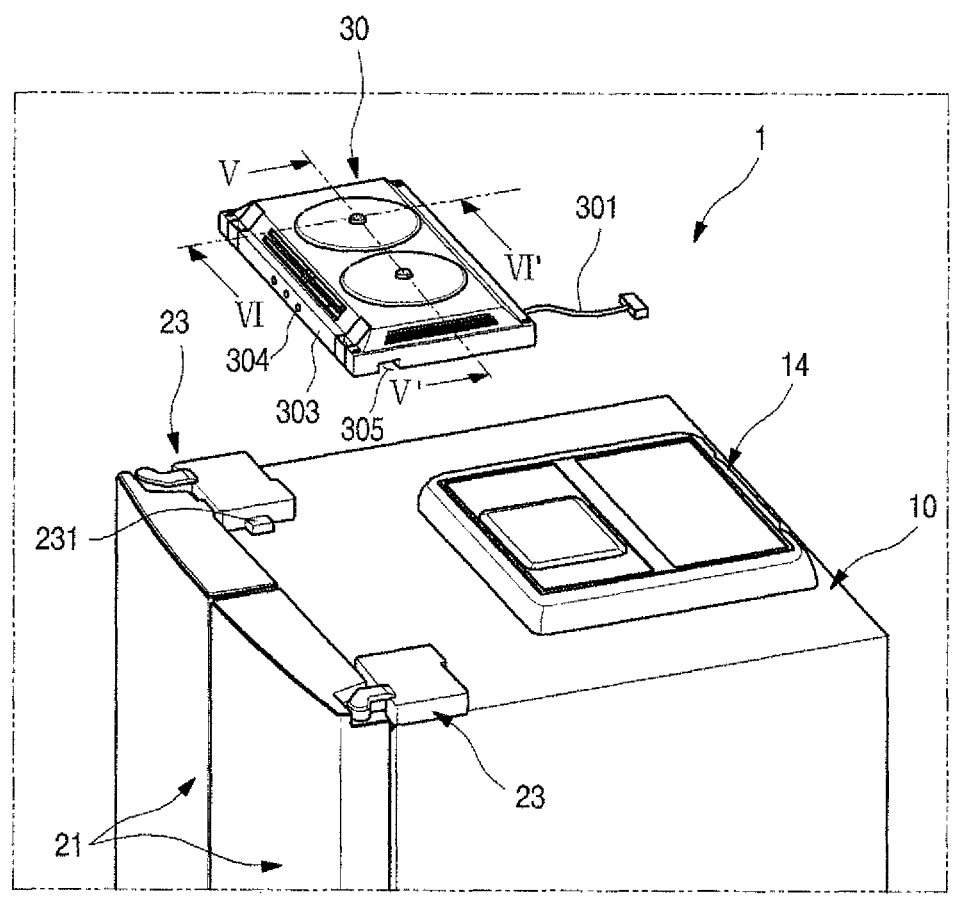
FIG. 3 is a view illustrating a state in which an air purifier is separated from the refrigerator according to an embodiment.

FIG. 3 is a view illustrating a state in which the air purifier is separated from the refrigerator according to an embodiment. As illustrated in the drawings, the air purifier 30 may be attached to or detached from the cabinet 10. Opposite sides of the air purifier 30 may be in contact with the hinges 23, respectively.

Further, mounting grooves 305 may be recessed in the opposite sides of the air purifier 30, respectively, and mounting protrusions 231 may protrude to have a shape corresponding to the mounting grooves 305, respectively. Thus, the air purifier 30 may be mounted on the cabinet 10 through vertical movement. The mounting grooves 305 and the mounting protrusions 231 may be coupled to each other so that a state in which the air purifier 30 is mounted on the cabinet 10 may be maintained. The hinges 23 may collectively refer to hinges for rotating the refrigerating chamber doors 21 and hinge covers that shield the hinges.

Magnets 336 may be provided on a bottom surface of the air purifier 30 and a state in which the air purifier 30 is stably attached to the cabinet 10 formed of steel may be maintained by the magnets 336. Of course, both a structure in which the mounting grooves 305 and the mounting protrusions 231 are coupled to each other and an attachment structure by the magnets 336 may be applied or any one of the two structures may be applied.

A power source unit 301 having a form of a power cable may be provided on or at one side of the air purifier 30. The power source unit 301 may be connected to a control connector of the main controller 14 through a connector. Thus, electric power required for driving of the air purifier 30 may be received through the main controller 14.

Figure 4:
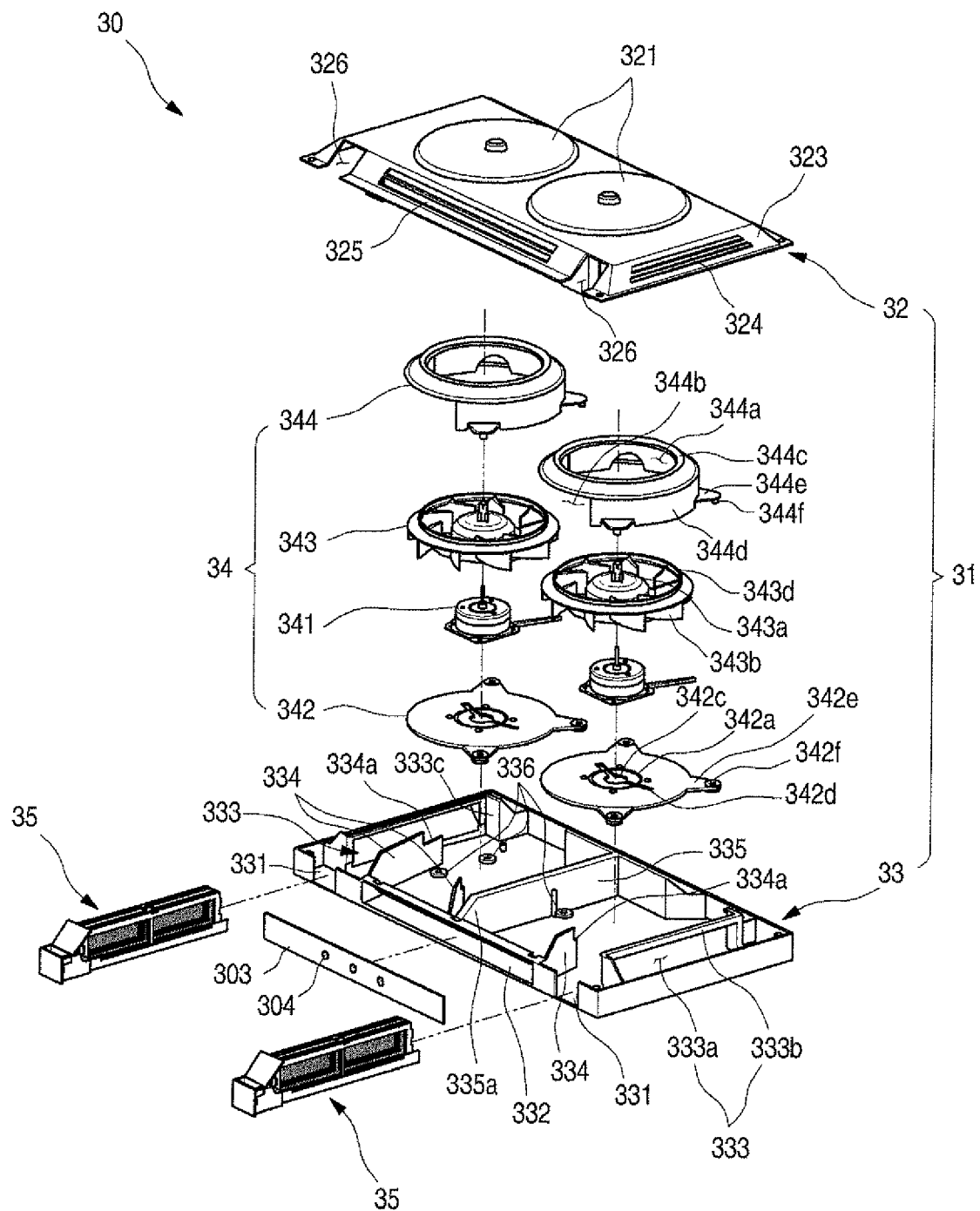
FIG. 4 is an exploded perspective view of the air purifier of FIG. 3.
Figure 5:
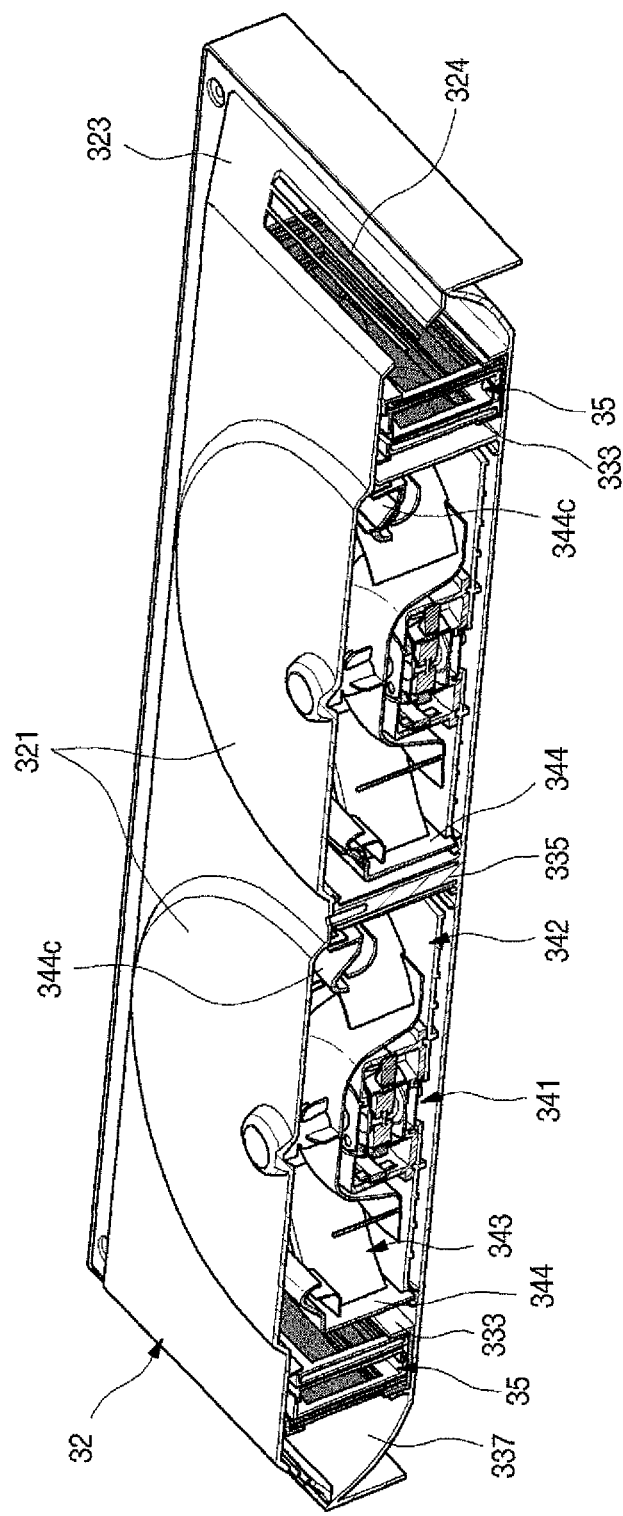
FIG. 5 is a sectional view taken along line V-V' of FIG. 3.
Figure 6:
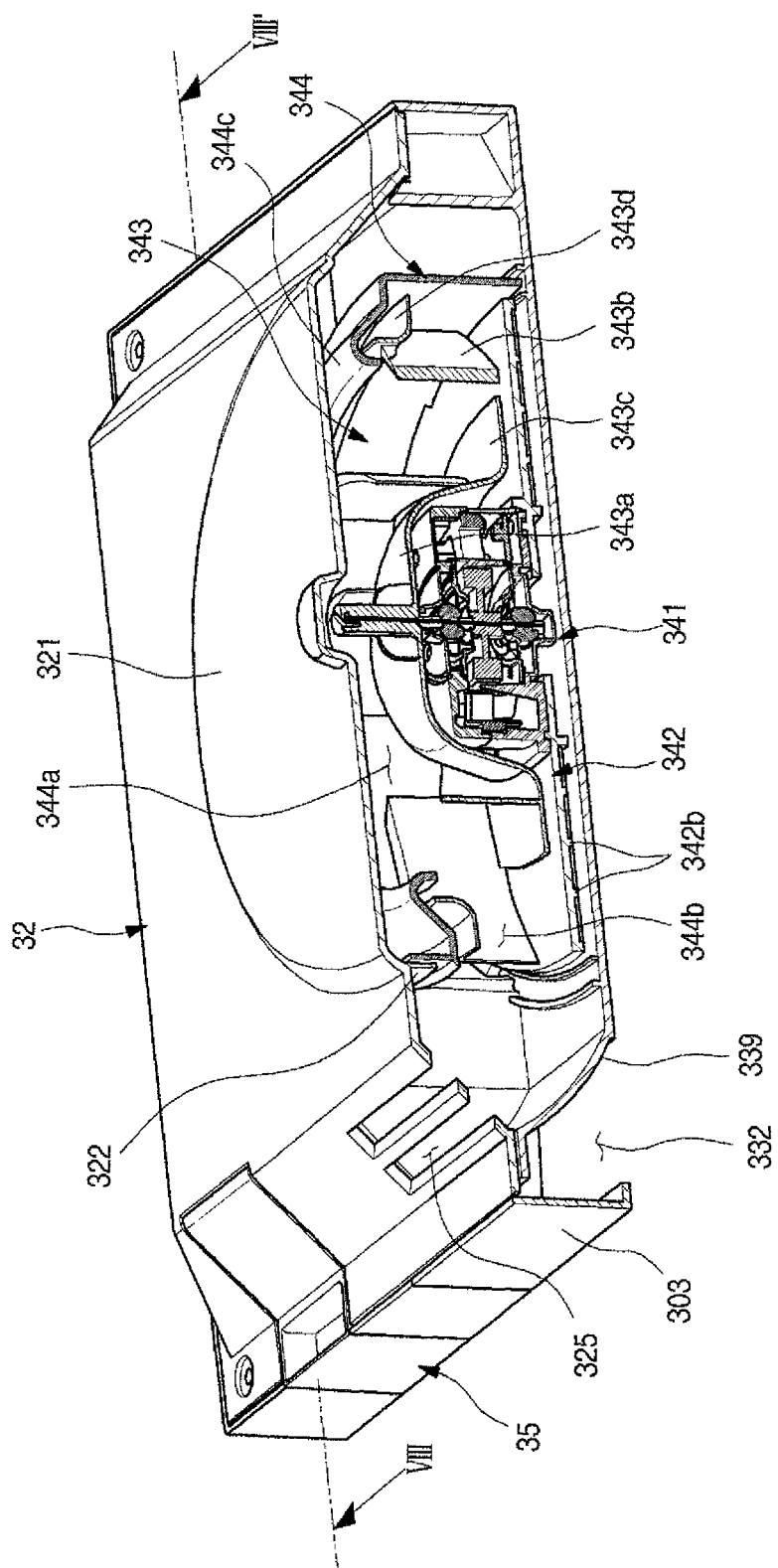
FIG. 6 is a sectional view taken along line VI-VI' of FIG. 3.

FIG. 4 is an exploded perspective view of the air purifier of FIG. 3, FIG. 5 is a sectional view taken along line V-V' of FIG. 3. FIG. 6 is a sectional view taken along line VI-VI' of FIG. 3.

As illustrated in the drawings, the air purifier 30 may include a case 31 that defines an outer appearance thereof, fan motor assemblies 34 provided inside of the case 31, and filter assemblies 35. The case 31 may include an upper case 32 and a lower case 33, and a space in which the fan motor assemblies 34 and the filter assemblies 35 are mounted may be provided inside of the case 31 when the upper case 32 and the lower case 33 are coupled to each other.

The upper case 32 may be configured to shield an upper surface of the lower case 33, an upper surface of which may be open. Further, suction guiding parts or guides 321 may be formed on an upper surface of the upper case 32. The suction guides 321 may protrude to have a shape corresponding to the fan motor assemblies 34, and an inner surface of the upper case 32 may be recessed. The suction guides 321 may define a space that guides air that flows within the case 31 such that the air may flow to centers of fans 343.

Shielding ribs 322 that protrude downward may be formed on an inner surface of the upper case 32. The shielding ribs 322 may be formed along circumferences of the suction guides 321, respectively. The shielding ribs 322 may be configured to prevent air that has been discharged along circumferential directions of the fans 343 when the fans 343 are rotated, from flowing backward and being then introduced to the centers of the fans 343. Thus, the shielding ribs 322 may extend to contact with fan guides 344, which will be described hereinafter, respectively.

An inclined surface 323 may be formed on or at a circumference of the upper case 32. The inclined surface 323 may connect the upper surface of the upper case 32 and a lower surface of the upper case 32 to each other. The upper surface of the upper case 32 may be smaller than the lower surface of the upper case 32, and thus, the inclined surface 323 may have a predetermined slope between the upper case 32 and the lower case 33. Further, inlet holes 324 and an outlet hole 325 may be formed on the inclined surface 323.

The inlet holes 324 may be formed on portions of the inclined surface 323, which correspond to opposite lateral (left and right in the drawing) surfaces of the upper case 32. Thus, air on opposite lateral sides of the refrigerator 1 may be suctioned through the inlet holes 324. Each inlet hole 324 may be defined by a plurality of slits that extends along a lengthwise direction of the lateral surfaces of the upper case 32, and may be formed to have a shape which is like a grill.

The outlet hole 325 may be formed on a portion of the inclined surface 323, which corresponds to a front surface of the upper case 32. Thus, the outlet hole 325 may allow suctioned air to be discharged to a front side thereof. Like the inlet holes 324, the outlet hole 325 may also be defined by a plurality of slits that extends along the lengthwise direction of the front surface of the upper case 32.

All the inlet holes 324 and the outlet hole 325 may be formed on the inclined surface 323. Thus, air which is suctioned into an interior of the air purifier 30 may be suctioned from above to below in an inclined direction and purified air may be discharged from below to above in the inclined direction. In particular, because air which is suctioned from the opposite lateral sides may be discharged to a front side thereof, the air may be three-dimensionally circulated. In particular, the outlet hole 325 may discharge the air to the front side such that the air is discharged upwardly at an incline.

Upper openings 326 may be formed on or at opposite sides of the outlet hole 325, respectively. Filter mounting ports 302 through which the filter assemblies 35 may be inserted and removed, may be defined by the upper openings 326 together with lower openings 331 of the lower case 33, respectively.

The upper openings 326 may be formed on or at opposite sides of the outlet hole 325 and may be cut from the inclined surface 323 to the upper case 32. Further, the upper openings 326 may be formed to have a corresponding shape such that the upper openings 326 may be shielded when the filter assemblies 35 are mounted.

The lower case 33 may define a bottom surface and lateral surfaces of the case 31 and define a space, an upper surface of which may be open, such that the fan motor assemblies 34 and the filter assemblies 35 may be accommodated therein. The lower openings 331 may be formed on a front surface of a circumference of the lower case 33 to be open at locations corresponding to the upper openings 326, respectively. The filter mounting ports 302, through which the filter assemblies 35 may be inserted and removed, may be defined by connecting the upper openings 326 and the lower openings 331 to each other through coupling between the lower case 33 and the upper case 32.

A front mounting part or portion 332, to which the display 303 and the manipulation button 304 may be mounted, may be recessed between the lower openings 331. Further, a front discharge guide 339 may be formed on an inner surface of the front mounting portion 332 or a front inner side of the lower case 33, which corresponds to the front mounting portion 332.

The front discharge guide 339 may be formed to have a predetermined slope or be rounded and an end thereof may extend to a lower end of the outlet hole 325 of the upper case 32. Further, the front discharge guide 339 may be formed on or at a lower side of the outlet hole 325 to have a length corresponding to the outlet hole 325. Thus, air that has been blown through the fan motor assemblies 34 may be moved forward and upward along the front discharge guide 339 and may be discharged through the outlet hole 325 in an inclined direction.

Filter guides 333 may be formed on rear sides of the lower openings 331, respectively. The filter guides 333 may extend rearward from locations corresponding to the lower openings 331, respectively, and may allow the filter assemblies 35 to be inserted into accurate locations when the filter assemblies 35 are inserted, respectively. Further, each filter guide 333 may have an opening 333a formed therein to enable flow of air and an edge 333b formed along an edge of the opening 333a to support a corresponding filter assembly 35. The edge 333b may have a shape corresponding to a frame of a corresponding one of filter modules 36, which will be described hereinafter.

The plurality of filter guides 333 may be formed so that the filter guides 333 may be supported on opposite sides. As needed, the filter guides 333 may be formed in the lower case 33 and the upper case 32 so that the filter guides 333 may be stably supported on the opposite sides.

A support surface 333c may be formed at a rear extending end of each filter guide 333. The support surface 333c may define a surface in contact with a rear end of the filter assembly 35 which is inserted into the case 31. Further, the support surface 333c may support a rear end of the filter assembly 35 such that the filter assembly 35 is completely inserted into an accurate location.

Further, discharge air guides 334 that extend such that air that is forcibly moved by the fan motor assemblies 34 passes through the fan motor assemblies 34 and is then moved to the front discharge guide 339 may be formed at opposite ends of the front discharge guide 339. The discharge air guides 334 may extend from the front discharge guide 339 and may extend to be in contact with open guide discharge holes 344b of the fan guides 344, respectively. The plurality of discharge air guides 334 may be in contact with opposite ends of the guide discharge holes 344b. The discharge air guides 334 may extend at an incline in a same direction as a rotational direction of the fans 343, and air discharged by the fans 343 may be effectively moved to the outlet hole 325.

Steps 334a may be formed at extending ends of the discharge air guides 334, respectively. The shielding ribs 322 formed on the upper case 32 may be seated on the steps 334a, respectively. Thus, a space through which air may be suctioned and a space through which the air may be discharged may be completely separated from each other by the discharge air guides 334 and the shielding ribs 322.

A plurality of magnets may be provided on a bottom surface of the lower case 33. A state in which the lower case 33 is attached to the cabinet 10 may be maintained by a magnetic force of the magnets.

Further, a barrier 335 that extends in a forward/rearward direction to partition an interior of the lower case 33 into opposite lateral (left and right in the drawings) parts or portions may be formed at a center of the lower case 33. A bent guide 335a may be further formed at a front end of the barrier 335 and the guide 335a may guide a portion of air that is blown by the fan motor assemblies 34 to the front discharge guide 339.

The fan motor assemblies 34 may be mounted in spaces partitioned by the barrier 335, respectively. Because the pair of fan motor assemblies 34 may be formed on opposite (left and right in the drawings) lateral sides, and have a same structure and a same shape but merely have a different arrangement, one fan motor assembly 34 will be described hereinafter.

The fan motor assembly 34 may include a motor 341 that provides power, a motor supporter 342 that supports the motor 341, a corresponding fan 343 which is rotated by the motor 341, and fan guide 344 which defines a suction and discharge passage for the air. The motor 341 provides power for rotating the fan 343 and may be fixedly mounted on the motor supporter 342. The motor 341 may be located at a center of the fan 343 and a rotary shaft of the motor 341 may be coupled to the fan 343 to rotate the fan 343.

The motor supporter 342 may have a plate shape and be mounted on a lower surface of the lower case 33. The motor supporter 342 may have a circular plate shape and may have a circular shape corresponding to the fan 343 and the fan guide 344. A plurality of reinforcement ribs 342*b* that radially extends and have a same center as that of the motor supporter 342 may be formed on a lower surface of the fan guide 344.

A motor mounting part or portion 342*a* may be formed at a center of the motor supporter 342, and a motor mounting hole 342*c*, to which a fastening member to mount the motor 341 may be fastened, may be formed at a circumference of the motor mounting portion 342*a*. Further, an electric wire hole 342*d*, through which an electric wire may be inserted and withdrawn, may be formed at a center of the motor mounting portion 342*a* so that the electric wire may be introduced through a bottom of the motor supporter 342 and be connected to the motor 341.

A plurality of supporter fixing parts or portions 342*e* that extends outward may be formed at a circumference of the motor supporter 342, and supporter mounting holes 342*f* may be formed in the supporter fixing portions 342*e*, respectively. The supporter fixing portions 342*e* may be arranged at a specific interval but may not be formed in an area of a guide discharge hole 344*b* of the fan guide 344 so as not to interfere with a flow of the air.

The fan 343 may be a centrifugal fan and may include a hub 343*a* formed at a center thereof such that the motor 341 may be accommodated therein, blades 343*b* arranged radially about the hub 343*a* such that the blades 343*b* may be fixed to a rotation plate 343*c*, and a shroud 343*d*, A turbo fan having a height less than a height of a cross flow fan and excellent suction and discharge functions even while having a compact size may be used as the fan 343.

The fan guide 344 may be coupled to the motor supporter 342 to define a space in which the fan 343 may be accommodated. Further, the fan guide 344 may include a guide suction hole 344*a*, through which air may be suctioned to the center of the fan 343 and the guide discharge hole 344*b*, through which the air may be discharged in a circumferential direction of the fan 343.

The guide suction hole 344*a* may be formed on an upper surface of the fan guide 344. A bell mouth 344*c* may be formed in or at a circumference of the guide suction hole 344*a* so that air may be smoothly suctioned. A diameter of the bell mouth 344*c* may be smaller than a diameter of a corresponding suction guide 321, and thus, may be located inside of the suction guide 321. Thus, air introduced into the suction guide 321 by rotation of the fan 343 may pass through the guide suction hole 344*a* via the bell mount 344*c* and may then be introduced into the center of the fan 343.

A lateral surface 344*d* may extend from a circumference of an upper surface of the fan guide 344. The lateral surface 344*d* may extend to the motor supporter 342, and a remaining portion except for the guide discharge hole 344*b* may be in contact with the motor supporter 342.

Further, a guide fixing part or portion 344*e* may be formed at a location of the lateral surface 344*d*, which corresponds to the supporter fixing portion 342*e*. The guide fixing portion 344*e* may extend outward from a location corresponding to the supporter fixing portion 342*e* and may have a same shape as a shape of the supporter fixing portion 342*e* such that the guide fixing portion 344*e* and the supporter fixing portion 342 overlap each other. The supporter fixing portion 342*e* may not be formed in an area of the guide discharge hole 344*b*.

A guide fastening part or portion 344*f*, which may be inserted by passing through the supporter mounting hole 342*f*, may be formed in the guide fixing portion 344*e*. A fixing member, such as a screw, may be fastened to the guide fastening portion 344*f* in a state in which the guide fastening part 344*f* passes through the supporter mounting hole 342*f* so that a state in which the motor supporter 342 and the fan guide 344 are coupled to each other may be maintained. Further, the motor supporter 342 and the fan guide 344 may be fixedly mounted on the lower case 33.

The guide discharge hole 344*b* may be formed to connect a pair of the discharge air guides 334 to each other such that air discharged through the fan guide 344 may completely flow to the outlet hole 325.

A gas sensor 306 may be provided on or at one side of an inside or an outside of the case 31. The gas sensor 306 may detect an air pollution level of a kitchen space in which the refrigerator 1 is installed or provided, and the air purifier 30 may be selectively driven according to the air pollution level detected by the gas sensor 306. In particular, the gas sensor 306, which may identify the air pollution level in a kitchen environment, may be configured to detect harmful gas generated by incomplete combustion, that is, carbon monoxide and nitrogen dioxide, for example.

Further, the filter assembly 35 may be mounted through a corresponding filter mounting port 302 formed on a front surface of the case 31. The filter assemblies 35 may be arranged between the inlet holes 324 and the fan motor assemblies 34, respectively, and may partition an internal space of the case 31. Thus, all air suctioned through the inlet holes 324 may be purified while passing through the filter assemblies 35 and may be discharged to an outside of the air purifier 30 via the outlet hole 325 through the fan motor assemblies 34.

The filter assemblies 35 may be provided on opposite lateral (left and right in the drawings) sides of the case 31 and may be inserted and withdrawn through the filter mounting port 302 in a sliding manner. Further, the entire filter modules 36, each of which may be configured by coupling a plurality of filters, may be inserted and withdrawn when the filter assemblies are inserted and withdrawn.

The filter assemblies 35 may have the same structure but different arrangement locations in that they are arranged on opposite lateral sides. Thus, one assembly of the filter assemblies 35 on opposite lateral sides will be described hereinafter.

Figure 7:
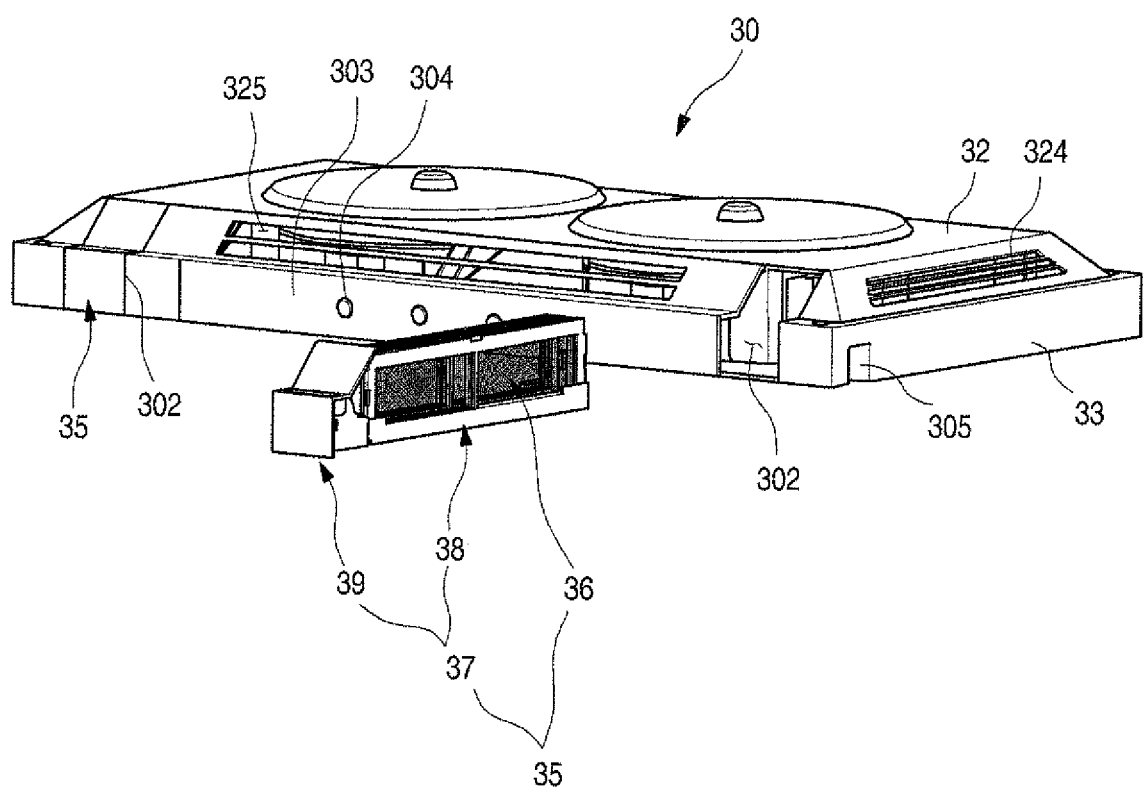
FIG. 7 is a view illustrating a state in which a filter assembly of the air purifier is separated therefrom.
Figure 8:
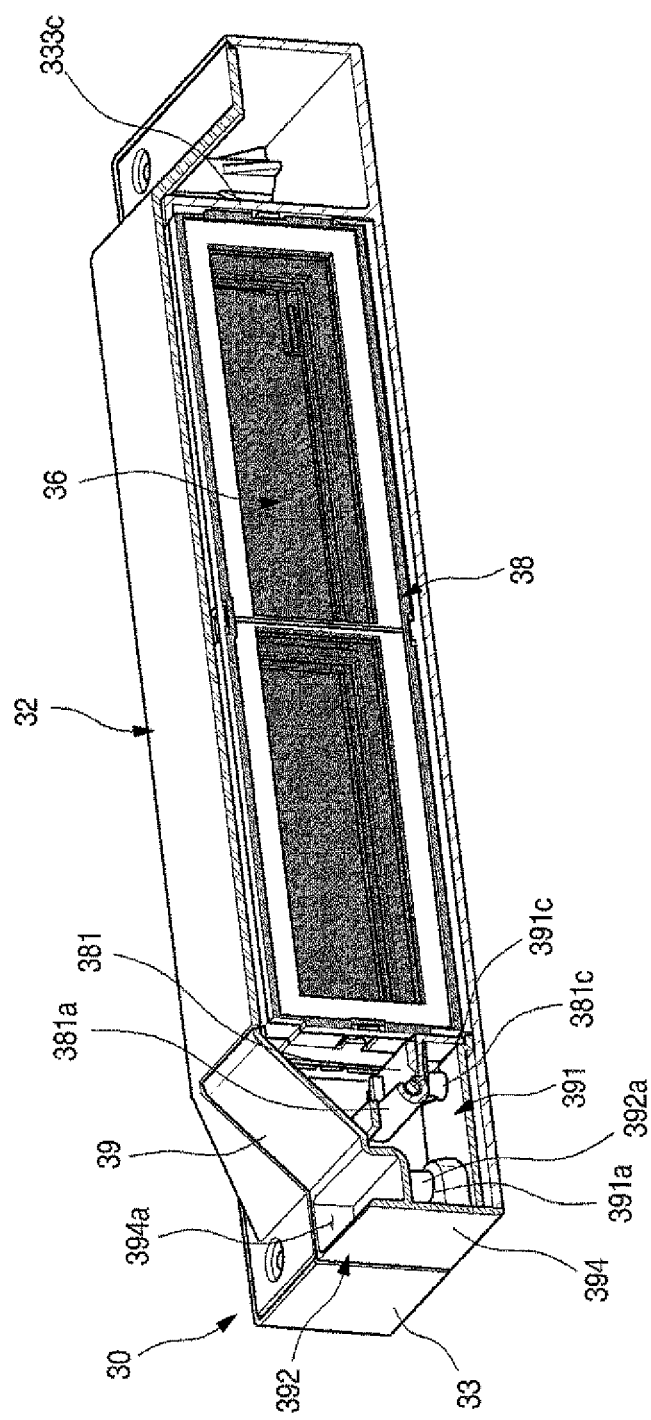
FIG. 8 is a sectional view taken along line VIII-VIII' of FIG. 6.

FIG. 7 is a view illustrating a state in which a filter assembly of the air purifier is separated therefrom. FIG. 8 is a sectional view taken along line 8-8' of FIG. 6.

As illustrated in the drawings, each filter assembly 35 may extend in forward/rearward directions, shield a corresponding filter mounting port 302 while being inserted into the case 31, and define a portion of an outer appearance of an outer surface of the case 31. To achieve this, the filter assembly 35 may include filter module 36 formed by coupling a plurality of filters 361, 362, 363, 364, 365 and 366, and filter case 37, to which the filter module 36 may be mounted. Further, the filter case 37 may include filter accommodating member 38 to/from which the filter module 36 may be attached/detached and withdrawal manipulating member 39 for insertion/withdrawal of the filter accommodating member 38.

The filter accommodating member 38 may be arranged inside of the case 31 while the filter module 36 may be mounted and may be configured to partition a space between a corresponding inlet hole 324 and a corresponding fan motor assembly 34, Further, the filter accommodating member 38 may be mounted at a predetermined location within the case 31 through a corresponding filter guide 333. Further, in a state in which the filter assembly 35 is completely inserted into the case 31, a rear end of the filter accommodating member 38 may contact the support surface 333c.

The withdrawal manipulating member 39 may shield the filter mounting port 302 and may be exposed to the outside while the filter assembly 35 is mounted. Thus, the withdrawal manipulating member 39 may be formed to correspond to a shape of an outer surface of the case 31. Further, the withdrawal manipulating member 39 may be exposed to the outside so that a user may easily manipulate it to manipulate insertion/withdrawal of the filter assembly 35.

The withdrawal manipulating member 39 may include a filter holder 391 coupled to a rotation coupling part or portion 381 at a front end of the filter accommodating member 38, and a filter cover 392 coupled to the filter holder 391 to shield the filter mounting port 302 of the case 31. The filter holder 391 may include a holder rod 391c coupled to the rotation coupling portion 381, and may be inserted/withdrawn together while being coupled to the filter accommodating member 38, when the withdrawal manipulating member 39 is inserted/withdrawn.

Further, the filter cover 392 may include an inclined part or portion 393 that corresponds to an inclined surface of the case 31, and a manipulation unit 394 that corresponds to a circumferential surface of the lower case 33. A handle groove 394a, which may be recessed downward, may be formed on an upper surface of the manipulation unit 394, and the user may manipulate the filter assembly 35 to be inserted/withdrawn while holding the handle groove 394a. Further, the handle groove 394a may be formed on an upper surface of the manipulation unit 394, which corresponds to an edge of the upper case 32.

Figure 9:
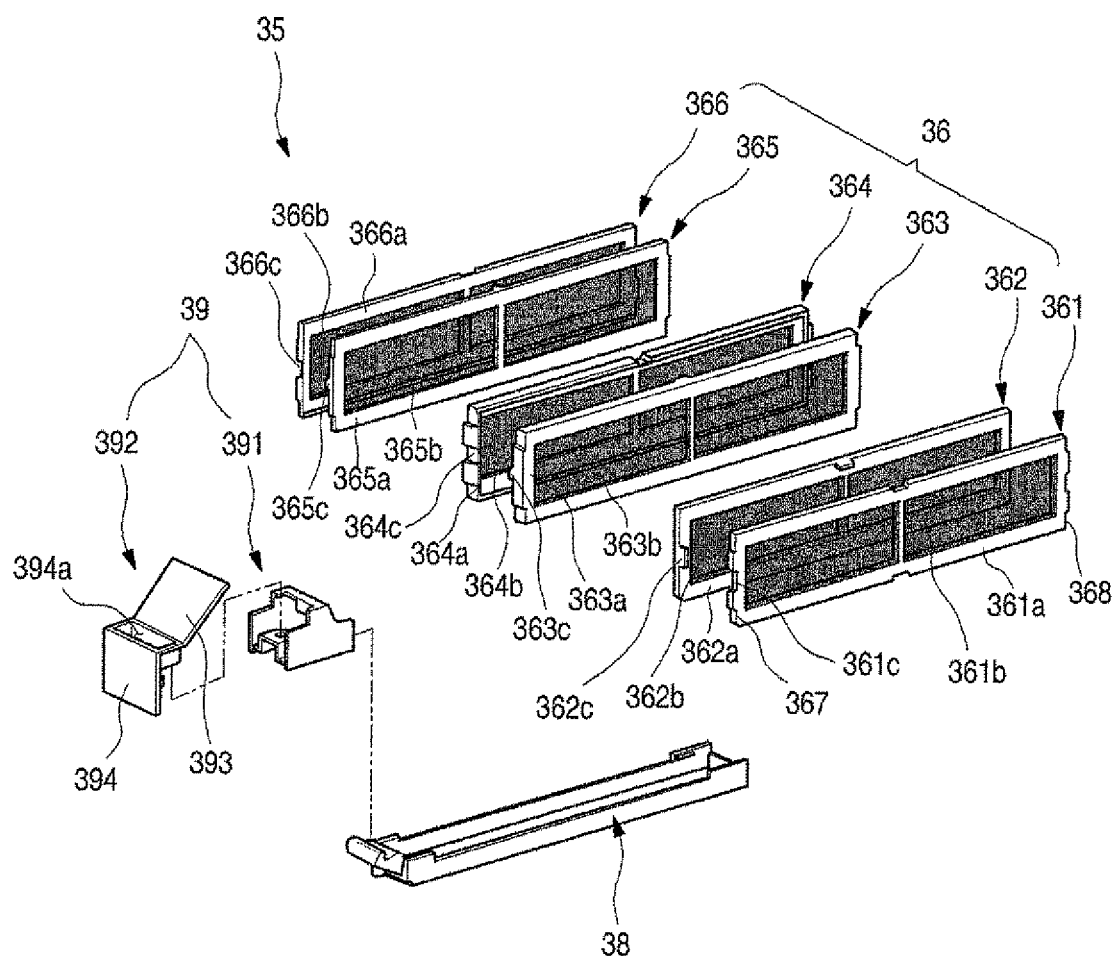
FIG. 9 is an exploded perspective view of the filter assembly according to an embodiment.
Figure 10:
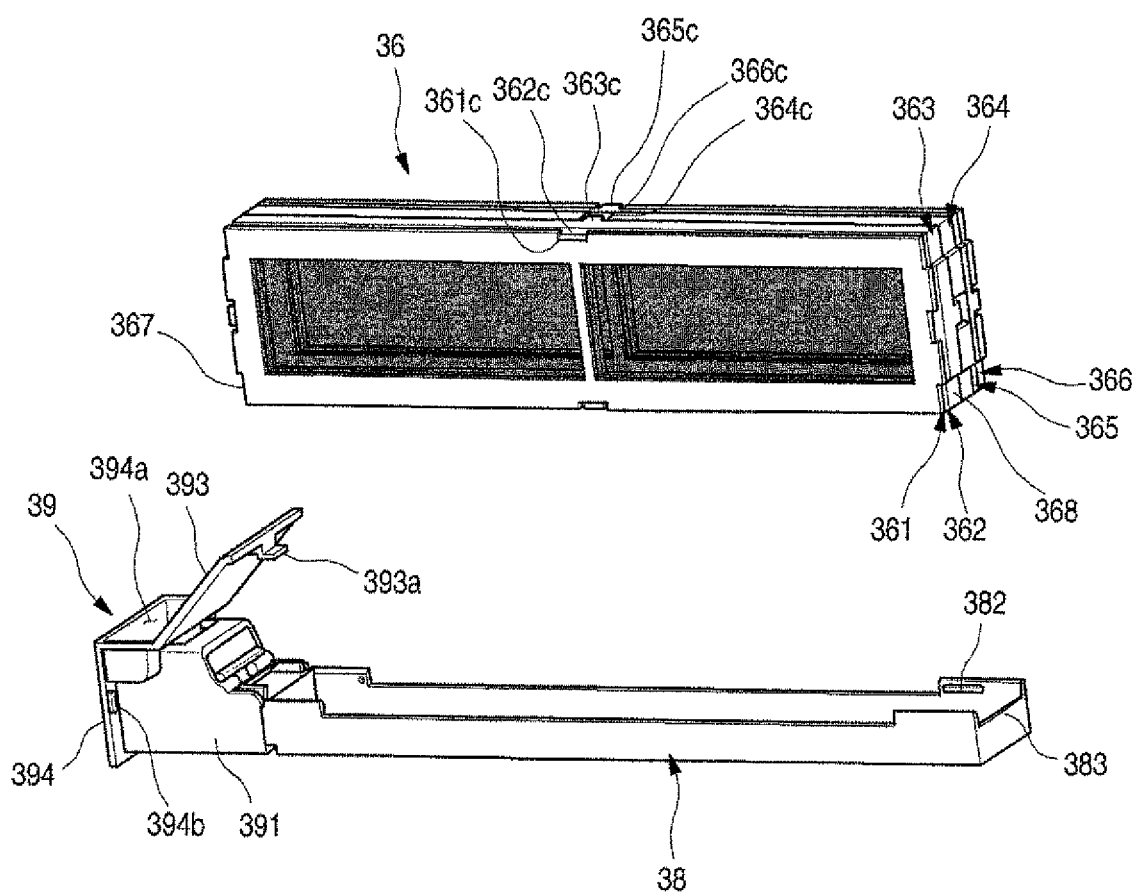
FIG. 10 is a view illustrating a state in which a filter module of the filter assembly according to an embodiment is separated therefrom.
Figure 11:
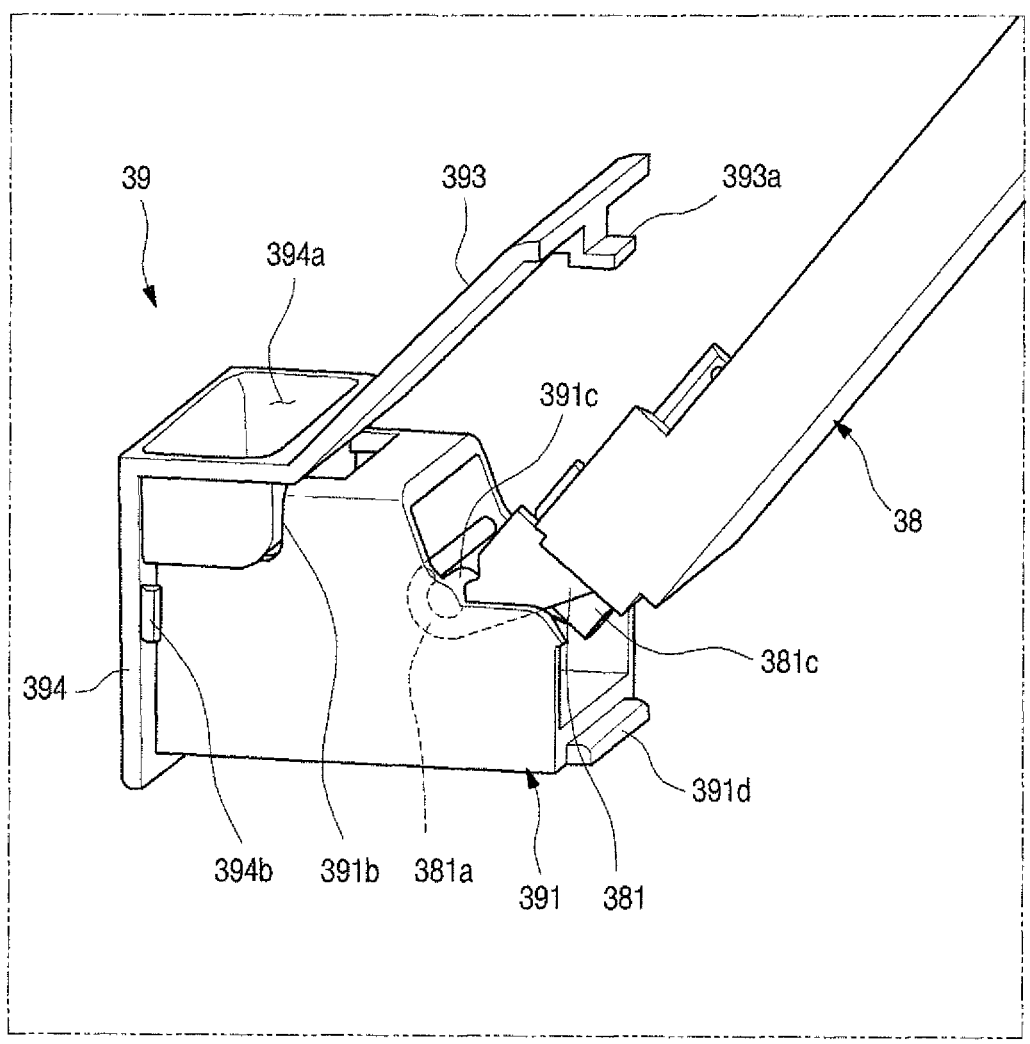
FIG. 11 is a partial perspective view illustrating a coupling structure of the filter assembly according to an embodiment.

FIG. 9 is an exploded perspective view of the filter assembly according to an embodiment. FIG. 10 is a view illustrating a state in which a filter module of the filter assembly according to an embodiment is separated therefrom. FIG. 11 is a partial perspective view illustrating a coupling structure of the filter assembly according to an embodiment.

Referring to the drawings, the filter assembly 35 will be described hereinafter. A cover boss 392a may be formed in the filter cover 392, and the cover boss 392a may be formed at a location corresponding to a fastening hole 391a of the filter holder 391. Thus, a screw that passes through the cover boss 392a may be fastened to the fastening hole 391a through the cover boss 392a so that the filter cover 392 and the filter holder 391 are coupled to each other.

A first cover fixing protrusion 393a may be formed at an upper end of the inclined portion 393. The first cover fixing protrusion 393a may protrude to an interior of the case 31 and may be caught by an upper open end of the filter mounting port 302 when the filter assembly 35 is mounted. Further, second cover fixing protrusions 394b may be further formed on opposite sides of a rear surface of the manipulation unit 394. The second cover fixing protrusions 394b may protrude to an interior of the case 31 and be caught by the upper open end of the filter mounting port 302 when the filter assembly 35 is mounted.

The first cover fixing protrusion 393a and the second cover fixing protrusions 394b may have a hook shape, such that the protrusions may be caught by the filter mounting port 302 which is formed in the case 31 and may have a protruding or coupleable different shape, as needed, Thus, when the filter assembly 35 is completely mounted, the first cover fixing protrusion 393a and the second cover fixing protrusions 394b may be caught by the filter mounting port 302 of the case 31.

The filter holder 391 may be formed to have a structure that extends in a frontward-rearward direction, that is, passes through a space between the filter cover 392 and the filter accommodating member 38. A front end of the filter holder 391 may be in close contact with the manipulation unit 394. A holder step 391b may be formed at an upper end of the front surface of the filter holder 391 and may be stepped to have a corresponding shape such that a lower end of the handle groove 394a of the filter cover 392 may be seated thereon.

The holder rod 391c rotatably coupled to the rotation coupling portion 381 of the filter accommodating member 38 may be formed inside of the filter holder 391. The holder rod 391c may be formed to cross an inside of the filter holder 391 and may be rotatably coupled to the rotation coupling portion 381. That is, the holder rod 391c may be a rotary shaft of the filter accommodating member 38.

A stopper 391d may be formed at a lower end of a rear surface of the filter holder 391. The stopper 391 may protrudes rearward, and may be coupled to a front end of the filter accommodating member 38 to restrain the filter accommodating member 38 from being rotated further in a clockwise direction (see FIG. 11).

The filter accommodating member 38 may have an upper open surface and may have a size corresponding to a width and a length of the filter module 36 such that the filter module 36 may be accommodated therein. Further, filter fixing protrusions 382 that protrude inward may be formed on inner surfaces of the filter accommodating member 38.

When the filter module 36 is mounted, the filter fixing protrusions 382 may be caught by lateral surfaces of the filter module 36 so that a state in which the filter module 36 is mounted on the filter accommodating member 38 may be maintained. Further, a seating part or portion 383, which may be downwardly recessed and on which a rear end of the filter module 36 may be seated when the filter module 36 is mounted, may be formed at a rear end of the filter accommodating member 38.

The rotation coupling portion 381 may be formed on a front surface of the filter accommodating member 38. The rotation coupling portion 381 may extend in the forward direction by a predetermined length and a hook part or portion 381a having a hook shape may be formed at an extending end thereof to surround the holder rod 391c. Further, the hook portion 381a may have a structure, a portion of which may be open such that the holder rod 391c may be pressed thereinto, and may be formed such that the filter holder 391 and the filter accommodating member 38 may be selectively coupled to or separated from each other. Further, the filter accommodating member 38 may be rotated about the holder rod 391c which may function as a shaft.

In this way, a coupling structure of the filter case 37 may facilitate forming of the filter accommodating member 38, the filter holder 391, and the filter case 37, and may be provided such that the withdrawal manipulating member 39 and the filter accommodating member 38 may be coupled to each other and inserted/withdrawn together.

An accommodation member boss 381c that extends downward may be formed at a lower portion of the rotation coupling portion 381. When the filter holder 391 and the filter accommodating member 38 are coupled to each other, the rotation coupling portion 381 and the accommodation member boss 381*c* of the filter accommodating member 38 may be inserted into an inner open space of the filter holder 391. Further, a screw, which may be fastened to a lower surface of the filter holder 391, may be fastened to the accommodation member boss 381*c* so that the filter accommodation member 38 may be prevented from being separated and rotated.

The filter module 36 may be attached to and detached from the filter accommodating member 38 in a module state in which a plurality of filters is coupled to each other. Thus, as needed, when maintenance of the filter module 36 is performed, the filter module 36 may be separated from the filter accommodating member 38. Next, a plurality of filters may be separated from each other, a maintenance operation for the plurality of filters may be performed, and the plurality of filters may then be assembled with each other and mounted on the filter accommodating member 38.

The filter module 36, through which air in a kitchen space may pass and be purified, may include filters matched with air characteristics of the kitchen space to effectively purify introduced air and then discharge the air. The filter module 36 may include the plurality of filters 361, 362, 363, 364, 365, and 366. Further, the filters 361, 362, 363, 364, 365 and 366 may include frames 361*a*, 362*a*, 363*a*, 364*a*, 365*a*, and 366*a* configured to be coupled to each other and filter members 361*b*, 362*b*, 363*b*, 364*b*, 365*b*, and 366*b* provided inside of the frames 361*a*, 362*a* 363*a*, 364*a*, 365*a*, and 366*a* to purify air that passes therethrough, respectively.

Further, the plurality of filter frames 361*a*, 362*a*, 363*a*, 364*a*, 365*a*, and 366*a* may be coupled to each other to form one module. Due to such a structure, the filters 361, 362, 363, 364, 365, and 366 having functions, respectively, may be detached or separated in a cartridge form together with the frames 361*a*, 362*a*, 363*a*, 364*a*, 365*a*, and 366*a*, and at least one of the plurality of filters 361, 362, 363, 364, 365, and 366 may be selectively detached based on an exchange period or a service situation.

Configurations of the filter module 36 will be described hereinafter. A first filter 361, a second filter 362, a third filter 363, a fourth filter 364, a fifth filter 365, and a sixth filter 366 may be sequentially arranged in an order of the first filter 361, the second filter 362, the third filter 363, the fourth filter 364, the fifth filter 365, and the sixth filter 366 from an outer side through which air is suctioned. The plurality of filters 361, 362, 363, 364, 365, and 366 may have a same size when viewed from a lateral side and may thus be coupled to each other to overlap each other.

The first filter 361 may be arranged to be closest to a corresponding inlet hole 324 and may be configured to filter dust and foreign substances having large particles within suctioned air. Further, the second filter 362 may be arranged to be in contact with the first filter 361 and may be configured to filter oil mist. That is, when minute oil mist generated during cooking in a kitchen are introduced into air in a mixed state, such oil mist may be filtered while passing through the second filter 362.

Further, a first mounting groove 361*c* may be formed in a first frame 361*a* of the first filter 361 and a first mounting protrusion 362*c* may be formed in a second frame 362*a* of the second filter 362. The first mounting groove 361*c* and the first mounting protrusion 362*c* may be coupled to each other so that the first filter 361 and the second filter 362 may be coupled. Thus, the first filter 361 and the second filter 362 may be attached to or detached from the filter accommodating member 38 while being coupled to each other.

The third filter 363 may be arranged next to the second filter 362 and may be configured to filter fine dust in air which has been passed through the second filter 362. A HEPA filter that filters extra fine dust having a particle size of 2.5 μm or less, such as smog, smoke, and exhaust gas, as well as fine dust having a particle size of 10 μm or less may be used as the third filter 363.

The fourth filter 364 may be arranged next to the third filter 363 and may filter carbon monoxide and nitrogen dioxide, for example, generated by incomplete combustion during cooking. A plurality of fourth filters 364 may be configured to remove carbon monoxide and nitrogen dioxide, for example, or may be configured as one filter to filter the harmful gas.

Further, the third filter 363 and the fourth filter 364 may be coupled to each other by coupling between a second mounting protrusion 363*c* formed in a third frame 363*a* and a second mounting groove 364*c* formed in a fourth frame 364*a*. Of course, when a plurality of fourth filters 364 are provided, the plurality of fourth filters 364 may be coupled to each other and may be coupled to also the third filter 363. The coupled filters may be mounted in the filter accommodating member 38.

The fifth filter 365 may be arranged next to the fourth filter 364. A sterilization filter that removes bacteria in air which has been passed through the fourth filter 364 may be employed as the fifth filter 365. Further, the sixth filter 366 may be arranged next to the fifth filter 365 and may be configured to remove odor causing factors in air that which been passed through the fifth filter 365, to perform deodorization.

The fifth filter 365 and the sixth filter 366 may be configured as one filter, and locations thereof may be changed, as needed. Further, a third mounting protrusion 365*c* may be formed in a fifth frame 365*a* of the fifth filter 365 and a third mounting groove 366*c* may be formed in a sixth frame 366*a* of the sixth filter 366 so that the fifth filter 365 and the sixth filter 366 may be coupled to each other.

Of course, six or more filters 361, 362, 363, 364, 365, and 366 may be provided, as needed. Further, when one filter has a plurality of functions, six or less filters may be provided. All the respective filters that form the filter module 36 may be provided independently or may be coupled to each other in an order of filters having similar replacement cycles or neighboring filters, as in the above-described embodiments.

The mounting protrusions 362*c*, 363*c*, and 365*c* and the mounting grooves 361*c*, 364*c* and 366*c* may have a hook shape or a shape corresponding thereto such that they are coupled to each other or are caught by each other. Further, the plurality of mounting grooves 361*c*, 364*c*, and 366*c* and the plurality of mounting protrusions 362*c*, 363*c*, and 365*c* may be formed along circumferences of the frames 361*a*, 362*a*, 363*a*, 364*a*, 365*a*, and 366*a*. Further, the plurality of mounting grooves 361*c*, 364*c*, and 366*c* and the plurality of mounting protrusions 362*c*, 363*c*, and 365*c* may be arranged at various locations of the frames 361*a*, 362*a*, 363*a*, 364*a*, 365*a*, and 366*a*, at which they are coupled to each other.

Further, the mounting protrusions 362*c*, 363*c*, and 365*c* and the mounting grooves 361*c*, 364*c*, and 366*c* which are coupled to each other may be formed to have different locations and different shapes such that the mounting protrusions 362*c*, 363*c* and 365*c* and the mounting grooves 361*c*, 364*c* and 366*c* may not be incorrectly coupled to each other. Thus, incorrect assembly between the filters 361, 362, 363, 364, 365, and 366 may be prevented, and when they are coupled to each other while being mated with each other, the filters 361, 362, 363, 364, 365, and 366 may be arranged in accordance with an order. Thus, a situation in which air cannot normally be purified by the incorrect assembly may be prevented.

Frame steps 367 and 368 may be formed at a front end and a rear end of each of the frames 361a, 362a, 363a, 364a, 365a and 366a. The frame steps 367 and 368 may be formed to have shapes corresponding to filter seating portions 383 formed at a front end and a rear end of the filter accommodating member 38, respectively.

The frame step 367 at front ends of the frames 361a, 362a, 363a, 364a, 365a, and 366a and the frame step 368 at rear ends of the frames 361a, 362a, 363a, 364a, 365a, and 366a may have different heights or different recessed depths, and may thus be mounted on the filter accommodating member 38 to have a directionality, while the filter module 36 is coupled. That is, a mounting direction is constant when the filter module is mounted, so that incorrect assembly of the filter module 36 by an operator may be prevented.

An operation of the air purifier having the above structure according to an embodiment will be described hereinafter.

Figure 12:
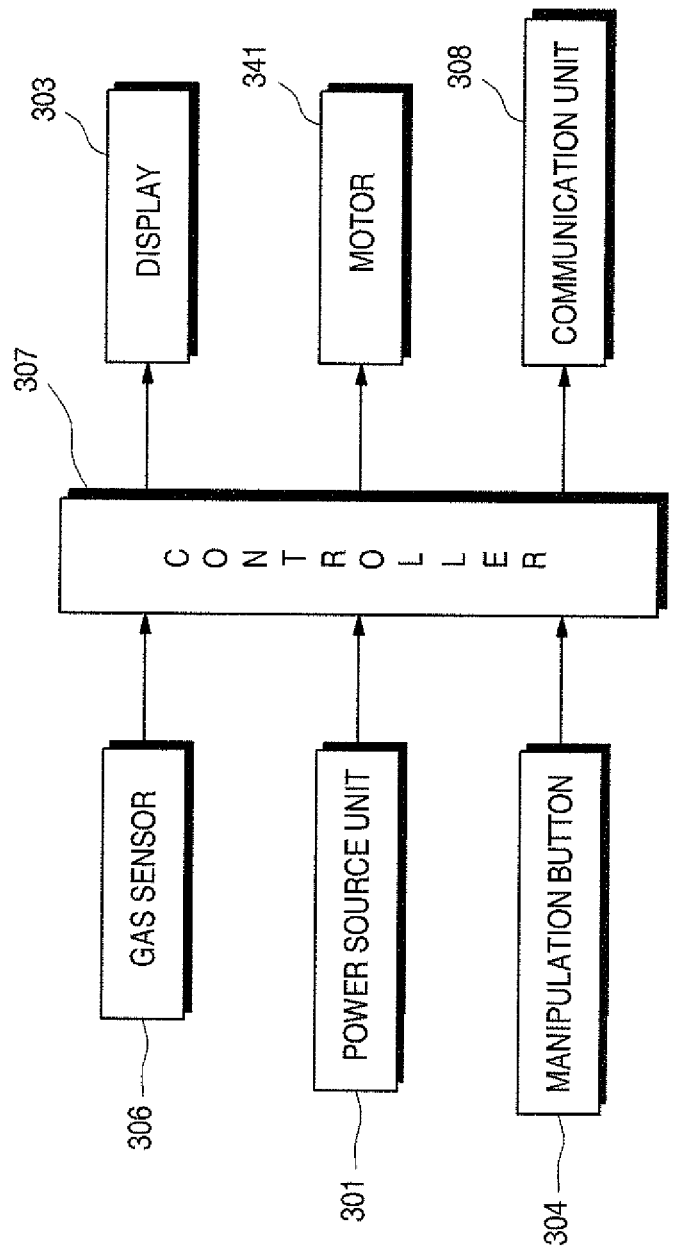
FIG. 12 is a block diagram of a flow of a control signal of the air purifier.
Figure 13:
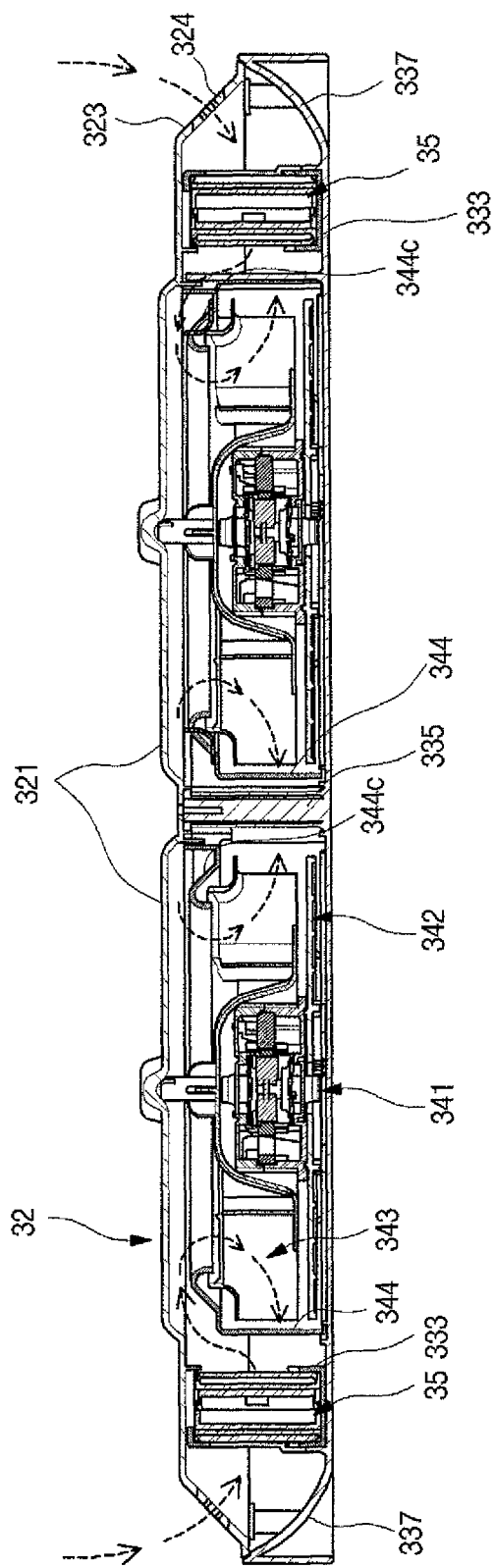
FIG. 13 is a sectional view illustrating a state in which external air is suctioned into and flows through the air purifier according to an embodiment.
Figure 14:
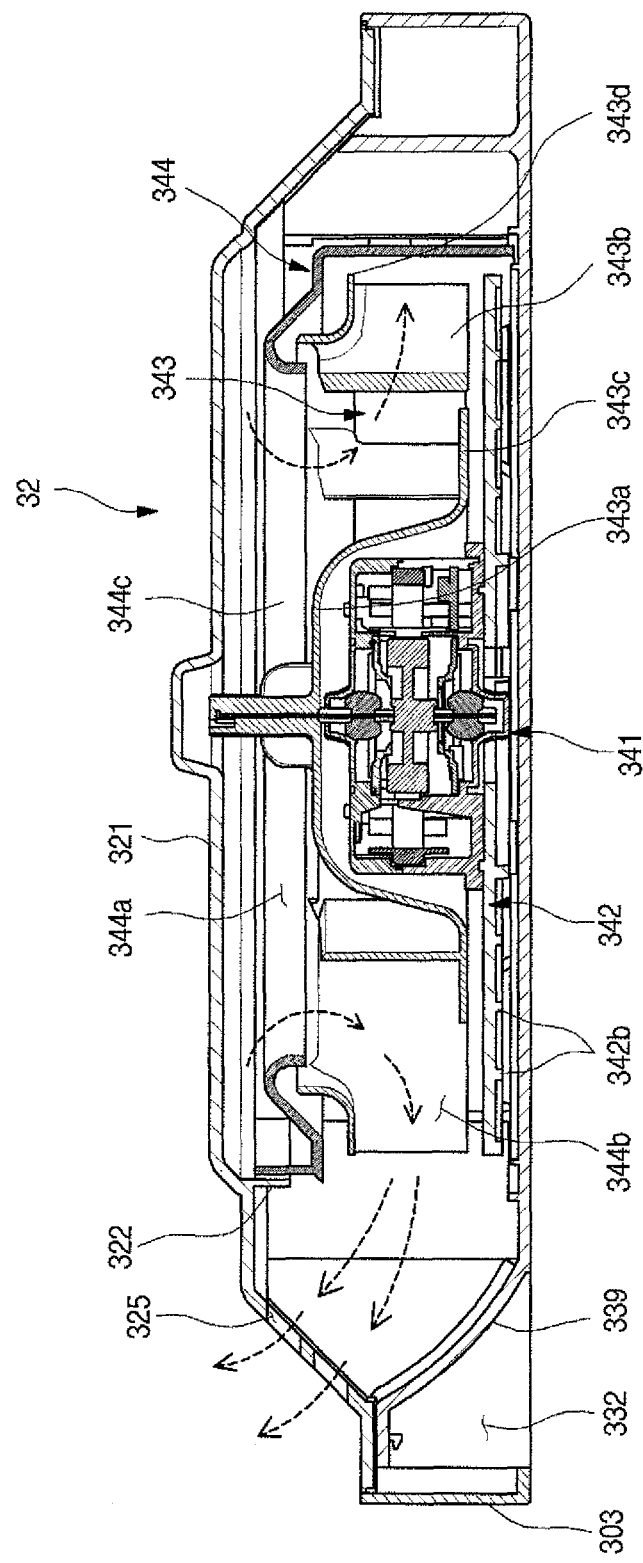
FIG. 14 is a sectional view illustrating a state in which air which is purified by the air purifier is discharged.

FIG. 12 is a block diagram of a flow of a control signal of the air purifier according to an embodiment. FIG. 13 is a sectional view illustrating a state in which external air is suctioned into and flows through the air purifier according to an embodiment. FIG. 14 is a sectional view illustrating a state in which air which is purified by the air purifier is discharged.

As illustrated in the drawings, the air purifier 30 may receive electric power through the power source unit 301 and an operation thereof may start when a user manipulates the manipulation button 304 or pollution of air within a kitchen space is detected by the gas sensor 306.

The display 303 may display an operation state of the air purifier 30 or a state of the air within the kitchen space, which is detected by the gas sensor 306, to the outside. In the air purifier 30, when a controller 307 receives an operation signal, motors 341 may be driven.

The fans 343 may be rotated by the driving of the motors 341 and air may be forced to flow according to the rotation of the fans 343. The air within the kitchen space may be introduced into the air purifier 30 through the inlet holes 324 on opposite lateral sides of the air purifier 30. Further, the air which has been introduced into the case 31 through the inlet holes 324 may be moved toward the filter assemblies 35 through side suction guides 337 which are rounded on opposite sides of the lower case 33.

The air which has been suctioned through the inlet holes 324 may sequentially pass through the plurality of filters 361, 362, 363, 364, 365, and 366 that form the filter module 36. That is, foreign substances having a large size may be filtered by the first filter 361, oil mist contained in the air may be filtered by the second filter 362, fine dust may be filtered by the third filter 363, harmful gas generated during cooking, especially, carbon monoxide and nitrogen dioxide, for example, may be filtered by the fourth filter 364, harmful bacteria in the air may be filtered by the fifth filter 365, and odor causing factors in the air may be filtered by the sixth filter 366.

The suctioned air which has passed through the filter module 36 may be purified while passing through the plurality of filters 361, 362, 363, 364, 365, and 366 that form the filter module 36. In particular, the oil mist, the harmful gas, and the odor causing factors generated in the kitchen space may be removed.

Further, the air which has passed through the filter module 36 may flow to the centers of the fans 343 through the guide suction holes 344a formed at upper surfaces of the fan guides 344. In a state in which the upper surfaces of the fan guides 344 and the upper surface of the upper case 32 are slightly spaced apart from each other, the air may smoothly flow through the guide suction holes 344a.

The air which is introduced into the fan guides 344 may be discharged in circumferential directions of the fans 343 through the rotation of the fans 343, may be moved along inner surfaces of the circular fan guides 344, and may then be moved to the guide discharge holes 344b.

The air which has been discharged to the guide discharge holes 344b may be guided to a front side along a passage which is formed by the discharge air guides 334 or the barrier 335 which formed inside of the case 31. The discharge air guides 334 and the barrier 335 may be arranged to be inclined in rotational directions of the fans 343 to allow the air which is discharged through the fans 343 to smoothly flow. The air which flows through the discharge air guides 334 or the barrier 335 may naturally flow upward along the front discharge guides 339 and may be discharged forwardly and upwardly in an inclined direction through the outlet hole 325 formed on the inclined surface 323.

The air purifier 30 has a structure in which air is suctioned in the inclined direction from opposite sides and is discharged to the front side in the inclined direction by the driving of the motors 341 so that the air may be three-dimensionally suctioned and discharged. Further, the fans 343 having a turbofan structure may be mounted in the air purifier 30 so that even while the air purifier 30 has a compact structure, a suction air flow rate and a discharge air flow rate may be increased and the air may be efficiently purified.

The motors 341 may adjust an air volume based on the air pollution level in the kitchen space, which may be detected by the gas sensor 306. Further, the motors 341 may also be operated until the air pollution level in the kitchen space, which is detected by the gas sensor 306, is lowered to a predetermined level or less. Further, as needed, the motors 341 may be operated for a set or predetermined period of time or until the manipulation button 304 is manipulated.

Further, the operation state of the air purifier 30 or the state of the air in the kitchen space may be transmitted to a mobile phone, a personal computer (PC), other communicable home appliances, or terminals of the user, for example, through a communication unit 308 connected to the controller 307, and the driving of the air purifier 30 may be manipulated by remote manipulation of the user.

In the air purifier 30, replacement or cleaning of the filters may be required, as needed. For the replacement or the cleaning of the filters, the filter assemblies 35 may be separated from the filter accommodating members 38, respectively.

To separate the filter assemblies 35, the user may hold and pull forward handle grooves 394a of withdrawal manipulation members 39. The filter assemblies 35 may be withdrawn in the forward direction by the withdrawal manipulation of the user, and the filter assemblies 35 may be completely separated from the case 31 through the filter mounting ports 302.

After the filter assemblies 35 are separated, the filter modules 36 may be separated from the filter accommodating members 38, respectively. Each filter module 36 may be separated at once or some filters that require tasks may be selectively separated in a module state, based on a coupling state.

After filters which require replacement or cleaning are separated after the filter modules 36 are separated, the required tasks may be performed. Thereafter, new or cleaned filters may be coupled to each other again. The filters in which the required tasks are completely performed and which are coupled to each other may be mounted on the filter accommodating members 38.

When the filter modules 36 are completely mounted, the filter assemblies 35 may be inserted into the filter mounting ports 302 and pushed into the case 31. The filter assemblies 35 may be inserted in a sliding manner until rear ends thereof come into contact with support surfaces 333c. Further, in a completely inserted state, withdrawal manipulating members 39 may be restrained by the filter mounting ports 302 so that a fixedly mounted state may be maintained. The air purifier 30 may be separable from the refrigerator cabinet 10 and may be separated therefrom when the air purifier 30 is not used or a service is required. The air purifier 30 may be configured to have a plug structure in which the power source unit 301 may be connected to a wall power source (electric outlet). In this case, the air purifier 30 may be independently operated while being separated from the refrigerator 1.

In addition to the above-described embodiment, various other embodiments of a refrigerator and an air purifier for a refrigerator may be applied.

Hereinafter, a refrigerator and an air purifier for a refrigerator according to another embodiment will be described. In this embodiment, elements having a same or similar structures as those according to the above-described embodiment are designated by the same reference numerals, and detailed descriptions thereof have been omitted.

Figure 15:
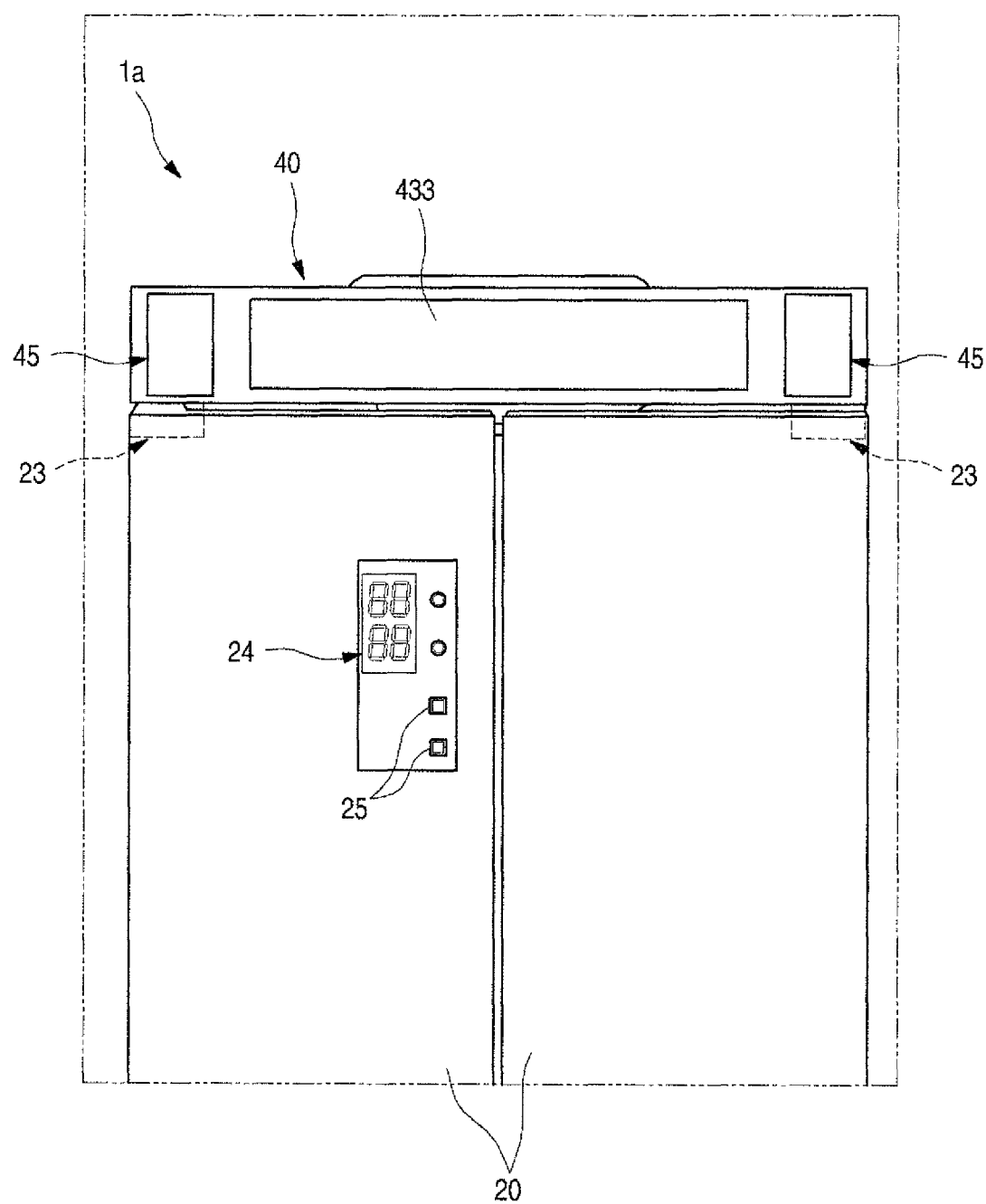
FIG. 15 is a partial front view illustrating a state in which an air purifier is mounted on a refrigerator according to another embodiment.
Figure 16:
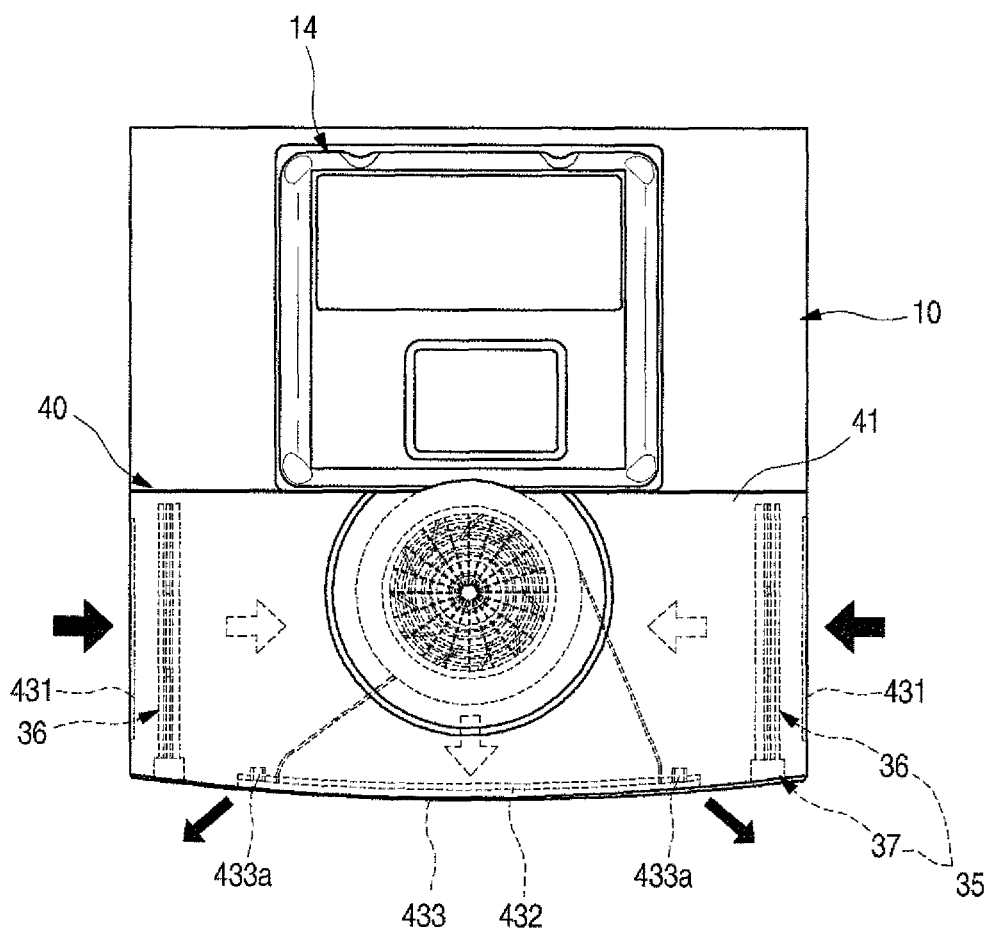
FIG. 16 is a plan view of the refrigerator of FIG. 15 on which the air purifier is mounted.

FIG. 15 is a partial front view illustrating a state in which an air purifier is mounted on a refrigerator according to another embodiment. FIG. 16 is a plan view of the refrigerator of FIG. 15 on which the air purifier is mounted.

As illustrated in the drawings, a refrigerator 1a according to another embodiment may include cabinet 10 that defines a storage space and doors 20 mounted on a front surface of the cabinet 10 to open/close the storage space.

The doors 20 may be rotatably mounted by hinges 23 provided on a front surface of the cabinet 10. Further, a display 24 to display an operation state of the refrigerator 1a and manipulation buttons 25 to manipulate driving of the refrigerator 1a may be provided on a front surface of the doors 20. The manipulation buttons 25 may be included in a touch display, in addition to a physical button structure and a touch sensor structure.

The display 24 may display an operation state of an air purifier 40 mounted on an upper surface of the cabinet 10. Further, the manipulation buttons 25 may be configured to perform a driving manipulation input of the air purifier 40.

Further, a main control unit or controller 14 to control an operation of the refrigerator 1a may be formed on an upper surface of the cabinet 10. The main controller 14 may be electrically connected to the air purifier 40 to supply electric power to the air purifier 40 and may control driving of the air purifier 40, as needed.

The air purifier 40 may be fixedly mounted on the upper surface of the cabinet 10. In a state in which the air purifier 40 is mounted, a case 41 that defines an outer appearance of the air purifier 40 may protrude to or at an upper side of the doors 20 to be exposed to the outside.

A front surface of the air purifier 40 may be exposed to the outside, and an outlet hole cover 433 that covers an outlet hole 432, through which purified air may be discharged, in a spaced state may be exposed to or at the upper side of the doors 20. Front surfaces of filter assemblies 35 may be exposed to or at opposite sides of the outlet hole cover 433. The filter assemblies 35 may be inserted into or withdrawn from filter mounting ports 438 formed in the case 41 to easily replace filter modules 36 by a user.

The air purifier 40 may be fixedly mounted on the upper surface of the cabinet 10. A size of the air purifier 40 may be formed to have a same lateral width as that of the cabinet 10 and to have a frontward rearward width corresponding to a distance between a front end of the main controller 14 and a front end of the doors 20. That is, in a state in which the air purifier 40 is mounted, an upper end of the refrigerator 1 may have an integral form.

Inlet holes 431 of the air purifier 40 may be formed on opposite sides of the case 41 so that air in a kitchen space may be suctioned from opposite sides thereof. Further, the air may be discharged to the front discharge hole 432 through air guides 435 after sequentially passing through the filter assemblies 35 and a fan motor assembly 44 provided in the air purifier 40.

Figure 17:
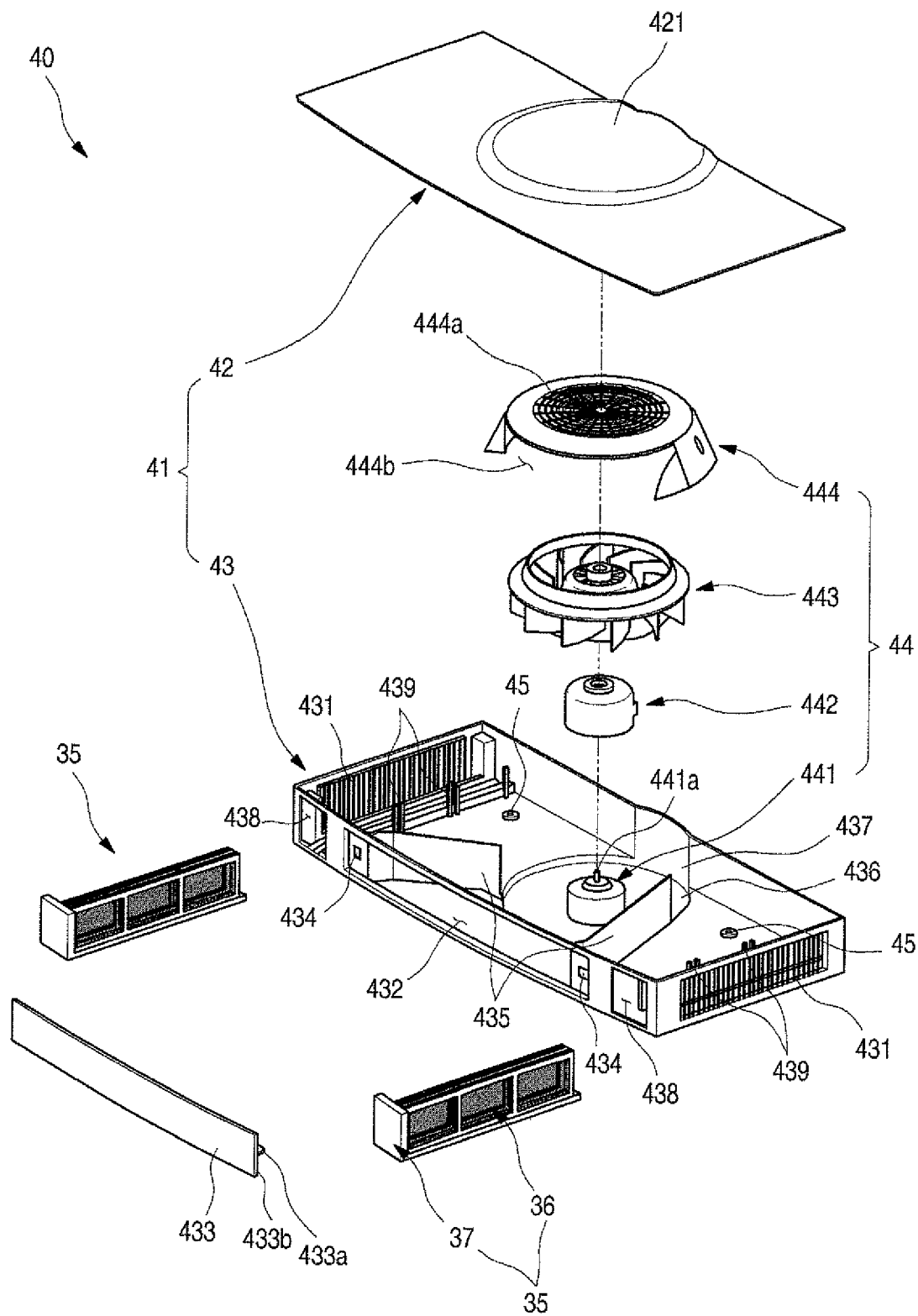
FIG. 17 is an exploded perspective view of the air purifier of FIG. 15.
Figure 18:
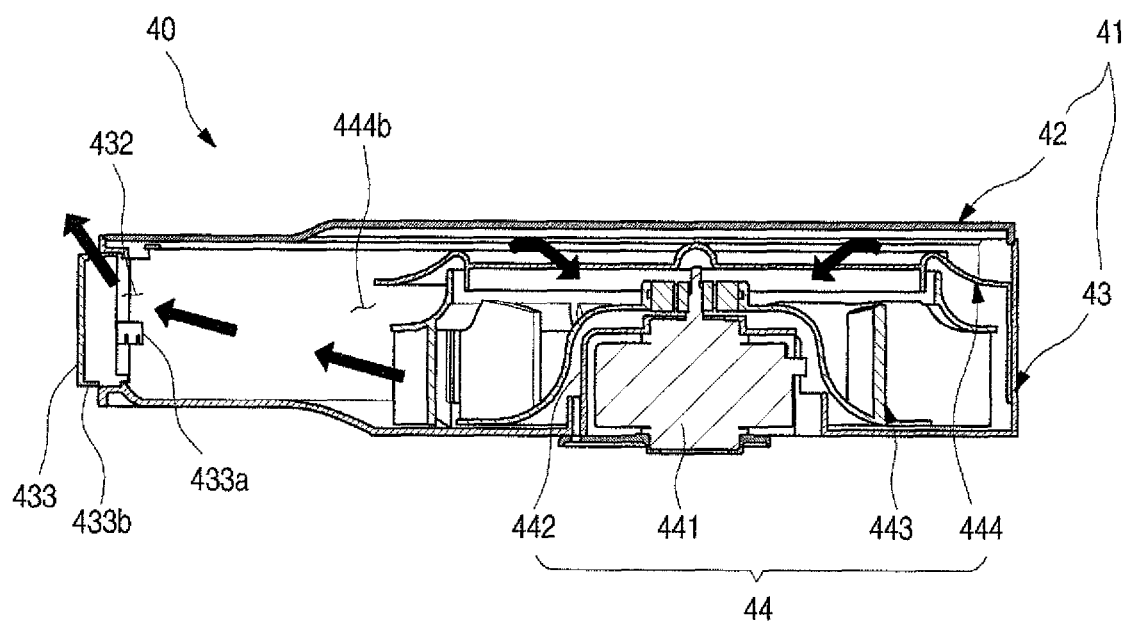
FIG. 18 is a sectional view illustrating an air flow in the air purifier of FIG. 15.

FIG. 17 is an exploded perspective view of the air purifier of FIG. 15. FIG. 18 is a sectional view illustrating an air flow in the air purifier of FIG. 15.

As illustrated in the drawings, an outer appearance of the air purifier 40 according to this embodiment may be defined by the case 41 which may be formed by coupling an upper case 42 and a lower case 43 to each other. The upper case 42 may cover an upper open surface of the lower case 43, a suction guide part or guide 421 that protrudes upward may be formed at a location corresponding to the fan motor assembly 44, and the fan motor assembly 44 may be arranged below the suction guide 421.

The lower case may 43 define a space in which the fan motor assembly 44 and the filter assemblies 35 may be accommodated. The upper open surface of the lower case 43 may be shielded by the upper case 42.

The inlet holes 431 may be formed on opposite lateral (in the drawings) sides of the lower case 43. The inlet holes 431 may have a grill shape and may be formed on most of areas on lateral surfaces of the lower case 43.

The outlet hole 432 may be formed on a front surface of the lower case 43. The outlet hole 432 may be covered by the outlet hole cover 433 and the outlet hole cover 433 may be spaced apart from the outlet hole 432. Thus, a space may be formed between the outlet hole 432 and the outlet hole cover 433 so that air which is discharged through the outlet hole 432 may be discharged to the space between the outlet hole 432 and the outlet hole cover 433.

To achieve this, cover mounting protrusions 433a that extend rearward toward the lower case 43 may be formed on opposite lateral (left and right in the drawings) sides of the outlet hole cover 433, and cover grooves 434, into and to which the cover mounting protrusions 433a may be inserted and fixed may be formed on opposite lateral (left and right in the drawings) sides of the outlet hole 432.

Further, a shielding part or portion 433b that shields a space between a lower end of the discharge hole cover 433 and a lower end of the discharge hole 432 may be further formed at a lower end of the discharge hole cover 433. The shielding portion 433b may prevent purified air from being discharged to the space between the lower end of the discharge hole 432 and the lower end of the discharge hole cover 433.

When the purified air is discharged to the space between the lower end of the outlet hole 432 and the lower end of the outlet hole cover 433, the air may be directly discharged to a face of the user, and thus, dissatisfaction of the user may be caused. Thus, the shielding portion 433b may prevent the air from being discharged to a lower side and allow the air to be discharged to an upper side and opposite sides.

The air guides 435 that extend toward a guide discharge hole 444b of the fan motor assembly 44 may be formed on opposite (left and right in the drawings) open sides of the outlet hole 432. The air guides 435 may connect an end of the outlet hole 432 and an end of the guide discharge hole 444b to each other and partition an internal space of the case 41. Thus, air which is discharged through the guide discharge hole 444b may be effectively guided and discharged to the outlet hole 432.

A fan motor mounting part or portion 436, on or to which the fan motor assembly 44 may be mounted, may be recessed in the lower case 43. The fan motor mounting portion 436 may be in contact with the air guides 435. Further, a recessed part or portion 437, on which a motor of the fan motor assembly 44 may be seated, may be further formed on a rear surface of the lower case 43 corresponding to a location of the fan motor mounting portion 436. The portion of the fan motor assembly 44 may be accommodated in the recessed portion 437 in a contact state, and thus, the recessed portion 437 may be recessed to correspond to an outer peripheral surface of the fan motor assembly 44.

The fan motor assembly 44 may include a motor 441 arranged at a center of the fan motor mounting 436, and a motor housing 442, in which the motor 441 may be accommodated. Further, the motor 441 may be mounted in the motor housing 442 such that a rotary shaft 441a of the motor 441 protrudes through the motor housing 442. Further, a fan 443 may be mounted on the protruding rotary shaft 441a. A turbofan, a size of which may be different from a size according to the previous embodiment and other characteristics of which may be identical to those according to the previous embodiment may be used as the fan 443. The fan 443 may have a structure in which air is suctioned in an axial direction thereof and discharged in a circumferential direction thereof.

The fan 443 may be accommodated in a fan guide 444. The fan guide 444 may be formed to have a shape, a lower surface which may be open such that the fan 443 may be accommodated therein, and a lower surface of the fan guide 444 may be formed to have a size corresponding to the fan motor mounting portion 436 and may be fixedly mounted on the fan motor mounting portion 436.

Further, an upper surface of the fan guide 444 may be spaced apart from the suction guide 421 and a guide suction hole 444a may be formed at a location corresponding to the suction guide 421. The guide suction hole 444a may be formed to have a shape, such as a grill, and guide air which has passed through the filter assembly 35 toward the fan 443.

Further, a circumferential surface of the fan guide 444 may extend downward, and at least a portion thereof may be open so that the guide discharge hole 444b may be formed. Opposite open ends of the guide discharge hole 444b may contact with the air guides 435 so that the air that may be discharged by the fan 443.

The filter mounting ports 438 may be formed on opposite sides of the discharge hole 432, respectively. The filter mounting parts 438, into and from which the filter assembly 35 may be inserted and withdrawn, may be shielded by a front surface of the filter assembly 35. Thus, in a state in which the filter assembly 35 is mounted in the case 41, the filter mounting ports 438 may be shielded.

The filter assembly 35 may include filter module 36 formed by coupling a plurality of filters, and a filter case 37, to which the filter module 36 may be mounted, A front surface of the filter case 37 may be exposed to the filter mounting ports 438, and thus, when a user holds and pulls forward the front surface of the filter case 37, the entire filter assembly 35 may be withdrawn.

Further, in a state in which the filter assembly 35 is completely inserted into and mounted on the case 41, the filter assembly 35 may partition an inside of the case 41. The filter assembly 35 may partition the space between the inlet holes 431 and the fan motor assembly 44, so that while air which is suctioned through the inlet holes 431 is moved to the fan motor assembly 44, all the air may pass through the filter assembly 35.

The filter module 36 may be detachably provided in the filter case 37 and may be configured by a combination of a plurality of filters. Because the filter module 36 may be identical to the filter module 36 in the previous embodiment, detailed description thereof has been omitted.

Oil mist, harmful gas, and odor causing factors in a kitchen space may be filtered by the filter module 36, and purified air may be discharged through the outlet hole 432 via the fan motor assembly 44.

Filter guides 439 to guide movement of the filter assembly 35 when the filter assembly 35 is inserted and withdrawn may be formed inside of lower case 43. The filter guides 439 may be provided on or at a rear side of the filter mounting ports 438, respectively, such that a plurality of ribs are arranged at a specific interval.

Magnets 45 may be provided in the lower case 43, and the air purifier 40 may be attached and fixed to the upper surface of the cabinet 10 of the refrigerator 1a by the magnets 45. The gas sensor 306 (see FIG. 12) according to the previous embodiment may be provided inside or outside of the case 41, and driving of the air purifier 40 may be adjusted by the gas sensor 306.

A refrigerator and an air purifier for a refrigerator thereof according to embodiments disclosed herein have at least the following advantages.

According to a refrigerator and an air purifier for a refrigerator according to embodiments disclosed herein, air within a kitchen space may be forcibly suctioned and purified. Harmful gas which may be generated during cooking, that is, carbon monoxide and nitrogen dioxide, for example, may be removed while passing through the filter module, so that the air within the kitchen space may be purified very effectively. In particular, the filter module may include a filter that filter oil mist and fine dust which may be generated during cooking. Thus, an excellent purifying performance for the air in the kitchen, which cannot be not expected in a purifier that purifies air in a general environment, may be expected.

Further, an operation of the air purifier may automatically start when the harmful gas is detected by the gas sensor, and the air purifier may be automatically driven until a state of the air arrives at a predetermined level. Thus, the air within the kitchen may always be maintained comfortable even without a separate manipulation. In particular, an air volume may be adjusted based on a level of the harmful gas, which may be detected by the gas sensor, so that the air within the kitchen may be purified more effectively.

Further, the filter module may be configured to be inserted into and withdrawn from the case while being mounted on the filter assembly. Thus, the filter module may be mounted or withdrawn by easily attaching or detaching the filter assembly so that services, such as replacement and cleaning of the filter module, for example, may be easily performed. In particular, the filter module may be detachably mounted on the filter case so that a service of the filter may be more easily performed. Also, the filter module may be formed by coupling filters having similar functions or similar service periods to each other so that the service and management of the filter may be more easily performed.

A turbofan providing an excellent air volume as compared to a size may be used in the air purifier, so that the air purifier may have an entirely compact structure. Due to such a compact structure, a space may be arranged between the door, the main controller, and the hinge so that a space usage is excellent. The air purifier may have a height which is lower than an upper end of the doors, and thus, the purifier may not be exposed to the outside in a closed state of the doors, so that an outer appearance of the refrigerator is not degraded. The display and the manipulation buttons may be exposed to a front surface of the air purifier when the doors are opened, so that the user may identify and manipulate an operation state more easily.

When the air purifier is fixedly mounted on the upper surface of the cabinet from above to below, the air purifier may be fixedly mounted through coupling with opposite sides of the hinge, and may be in contact with the hinge and the main controller even without a separate coupling structure. When the magnets are provided on a bottom surface of the case, the air purifier may have a structure that comes into contact with a cabinet formed of steel by a magnetic force so that a stable mounting state may be maintained even without a separate coupling structure.

The air purifier may have a structure which is selectively coupled to the refrigerator, may have a structure which may be connected to a separate power source and may be connected to a power source to receive electric power even in a state in which it is separated from the refrigerator, so that independent utilization may be possible. Driving of the air purifier may be controlled by the main controller, an operation state of the air purifier may be output to the display on the doors, and driving of the air purifier may be manipulated using the manipulation buttons on the doors so that convenience of use may be further improved.

In an air purifier for a refrigerator according to embodiments, the gas sensor may detect carbon monoxide and nitrogen dioxide, for example, in the air, harmful gases. The controller may start driving of the fan motor assembly when the harmful gas is detected at a predetermined reference level or higher and may stop the fan motor assembly when the harmful gas is detected at a predetermined reference level or lower.

The filter module may be integrally configured by coupling filters having replacement cycles and service cycles similar to each other. The filter module may be integrally formed by coupling filters having similar functions to each other.

The filter module may include a first filter which may be arranged to be closest to the inlet holes to filter foreign substances; a second filter which may be arranged next to the first filter to filter oil mist; a third filter which may be arranged next to the second filter to filter fine dust; a fourth filter which may be arranged next to the third filter to filter the harmful gas; a fifth filter which may be arranged next to the fourth filter to sterilize bacteria; and a sixth filter which may be arranged next to the fifth filter to filter odor causing factors.

The plug may be provided in the power source unit and may be connected to an electric outlet that supplies electric power. The connector may be provided in the power source unit and may be connected to a power line of the refrigerator.

The outlet hole cover that covers the outlet hole may be provided in front of the outlet hole, which may be opened on the front surface of the case, and the cover protrusions that extend rearward to be coupled to the front surface of the case may be formed at opposite ends of the outlet hole cover. The shielding part or portion that extends rearward to be in contact with the outlet hole and shields downward discharge of the outlet hole may be formed at the lower end of the outlet hole cover.

A refrigerator according to an embodiments disclosed herein may include a cabinet that has a storage space; a pair of doors which may be provided on a front surface of the cabinet to open/close the storage space; a pair of hinges which may be provided on opposite sides of an upper surface of the cabinet and to which the pair of doors may be rotatably coupled; a main control unit or controller that is provided on an upper surface of the cabinet to control driving of the refrigerator; and an air purifier which may be mounted in contact with a rear end of the doors, a front end of the main control unit, and the pair of hinges to suction air within a kitchen space, filter harmful gas, and then discharge the filtered air. The air purifier may be formed to have a height which is lower than an upper end of the refrigerating chamber doors while being mounted on the cabinet.

The air purifier may include a case that has an outlet hole on a front surface thereof that faces the doors and inlet holes on opposite sides thereof; fan motor assemblies which may be provided inside of the case to force flow of air; filter assemblies which may be mounted in the case to partition a space between the inlet holes and the fan motor assemblies and purify suctioned air; and a gas sensor which may be connected to one side of the case to detect harmful gas in a kitchen space.

Each of the fan motor assemblies may include a motor; a turbofan which may be rotated by the motor and accommodate the motor; and a fan guide which may accommodate the turbofan and guide air such that the air is suctioned in an axial direction and discharged in a circumferential direction. A suction guide part or guide that protrudes upward may be formed at a location corresponding to the fan guide on an upper surface of the case, and the suction guide part and the fan guide may be spaced apart from each other to guide flow of air to the fan guide.

The case may include a lower case that defines an accommodation space of the fan motor assemblies and the filter assemblies, and an upper case the shields an upper open surface of the lower case. An inclined surface may be formed along an edge of the upper case and the inlet holes and the outlet hole may be formed on the inclined surface.

Side suction guides that connect a bottom surface and lower ends of the inlet holes to each other, has a predetermined curvature, and guides suctioned air may be formed on opposite sides of an inner portion of the lower case, and a front discharge guide that connects a bottom surface and a lower end of the outlet hole to each other, has a predetermined curvature, and guides discharged air to the outlet hole may be formed on a front surface of an inner portion of the lower case. The air purifier may be connected to the main control unit to receive electric power such that an operation thereof may be controlled.

A display that displays an operation state of the air purifier and a manipulation button which may be manipulated by the user to manipulate driving of the air purifier may be formed in the doors.

Mounting protrusions and mounting grooves that protrude or are recessed to have shapes corresponding thereto to be coupled to each other may be formed on inner surfaces of the pair of hinges, which may face each other, and opposite surfaces of the case, which may correspond thereto. Magnets which may be attached to an upper surface of the cabinet which may be formed of steel by a magnetic force may be provided on a bottom surface of the case.

Embodiments disclosed herein provide a refrigerator and an air purifier for a refrigerator, which may effectively purify air in a kitchen space. Further, embodiments disclosed herein provide a refrigerator and an air purifier for a refrigerator, which may remove carbon monoxide and a nitrogenous compound from a kitchen space.

Also, embodiments disclosed herein provide a refrigerator and an air purifier for a refrigerator, which may be automatically switched on/off based on a state of air in a kitchen space to actively purify the air. Additionally, embodiments disclosed herein provide a refrigerator and an air purifier for a refrigerator, in which maintenance of a filter is easy.

Embodiments disclosed herein, further provide a refrigerator and an air purifier for a refrigerator, which may have a compact structure that may be mounted on a refrigerator. Moreover, embodiments disclosed herein provide a refrigerator and an air purifier for a refrigerator, which does not degrade an outer design of a refrigerator even while being mounted on the refrigerator.

Embodiments disclosed herein provide a refrigerator to/from which an air purifier may be easily attached/detached. Embodiments disclosed herein also provide a refrigerator and an air purifier for a refrigerator, which may be mounted on a cabinet or may be independently used.

An air purifier for a refrigerator according to an embodiments disclosed herein may include a case which may be mounted on an upper surface of a cabinet of a refrigerator and in which inlet holes and an outlet hole may be formed; fan motor assemblies which may be provided inside of the case to force flow of air; filter assemblies which may be mounted in the case to partition a space between the inlet holes and the fan motor assemblies and purify suctioned air; a control unit or controller that controls driving of the fan motor assemblies; and a gas sensor which may be connected to the control unit to detect harmful gas in a kitchen space. The control unit may control driving of the fan motor assemblies through detection of the gas sensor. The control unit may control the fan motor assemblies such that an air volume may be varied based on detection of the harmful gas.

Filter mounting ports, which may be forwardly opened, may be formed in the case, and the filter mounting ports may be shielded by the filter assemblies, which may be inserted into or withdrawn from an interior of the case in a sliding manner. Filter guides that protrude to be in contact with lateral surfaces of the filter assemblies to guide insertion/withdrawal of the filter assemblies may be formed inside of the case on rear sides of the filter mounting ports, respectively.

Each of the filter assemblies may include a filter module, which may be formed by coupling a plurality of filters, and a filter case, in which the filter module in a coupled state may be accommodated and which may be provided to be inserted into or withdrawn from an interior of the case. The filter case may include a filter accommodating member that provides a space into and in which the filter module may be inserted and accommodated and a withdrawal manipulating member which may be coupled to a front end of the filter accommodating member, exposed through a corresponding filter mounting port, and inserted or withdrawn by manipulation of a user.

A rotation coupling part or portion that extends toward the withdrawal manipulating member may be formed in the filter accommodating member, and a holder rod, which may be rotatably coupled to the rotation coupling part, may be formed in the withdrawal manipulating member. A cover fixing protrusion, which may be caught by the filter mounting port, may be formed in the withdrawal manipulating member in a state in which the filter assembly is mounted. A handle groove, which may be recessed to be held by the user to facilitate manipulation for insertion/withdrawal of the filter assembly, may be formed in the withdrawal manipulating member.

The filter assembly may include a filter that filters oil mist and a filter that filters the harmful gas. Each of the fan motor assemblies may include a motor; a motor supporter which may be fixed to a bottom surface of the case to support the motor; a fan which may be rotated by the motor and suction air in a central direction thereof to discharge the air in a circumferential direction thereof; and a fan guide which may be coupled to the motor supporter, define a space in which the fan may be accommodated, and define a guide suction hole through which air may be introduced into the fan, and a guide discharge hole through which the air may be discharged by the fan. A discharge air guide that connects the outlet hole and the guide discharge hole to each other to guide the discharged air may be formed in the case.

A display to display an operation state of the air purifier and a manipulation button which may be manipulated by the user to manipulate driving of the air purifier may be formed on a front surface of the case, which may face doors of the refrigerator. The outlet hole may be formed above the display on the front surface of the case, and the inlet holes may be formed on opposite sides of the case with reference to the outlet hole.

A front discharge guide may be rounded from a bottom to the outlet hole to guide discharged air toward the outlet hole may be formed on an inner surface of the case, which corresponds to the display.

A barrier may be provided inside of the case to partition an interior of the case into opposite lateral left and right sides, and the fan motor assemblies and the filter assemblies may be provided in the respective spaces which may be partitioned by the barrier. The barrier may extend to partition the outlet hole, and a guide which may be bent in an air flow direction may be further formed at an end of the barrier which may be in contact with the outlet hole.

Magnets which may be attached to an upper surface of the cabinet which may be formed of steel by a magnetic force may be further provided on a bottom surface of the case.

The air purifier may further include a power source unit that extends toward an outside of the case to supply electric power to the air purifier for a refrigerator.

An outlet hole cover that covers the outlet hole in a spaced state may be formed on a front side of the outlet hole which may be opened on a front surface of the case, and a shielding part or shield that extends rearward to block discharge of air to a lower side of the outlet hole may be formed at a lower end of the outlet hole cover.

The details of one or more implementations are set forth in the accompanying drawings and the description. Other features will be apparent from the description and drawings, and from the claims.

Even though all the elements of the embodiments are coupled into one or operated in the combined state, the present disclosure is not limited to such an embodiment. That is, all the elements may be selectively combined with each other without departing from the scope of the invention. Further, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope as defined by the appended claims. Therefore, the embodiments should be considered in a descriptive sense only and not for purposes of limitation, and the technical scope is not also limited to the embodiments. Further, embodiments are defined not by the detailed description but by the appended claims, and all differences within the scope will be construed as being comprised in the present disclosure.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
    a cabinet having a storage space;
    a door that opens and closes the storage space; and
    an air purifier disposed on an upper surface of the cabinet;
        wherein the air purifier includes:
        a case configured to be mounted on an upper surface of a cabinet of a refrigerator and in which inlet holes and an outlet hole are formed;
        a fan motor assembly provided inside of the case to force a flow of air;
        a gas sensor disposed on a case and configured to detect gas generated by incomplete combustion;
        a plurality of filter assemblies mounted in the case to partition a space between the inlet holes and the fan motor assembly and purify suctioned air;
        a controller that controls driving of the fan motor assembly according to a detection by the gas sensor.

2. The refrigerator of claim 1, wherein the gas sensor detects carbon monoxide and nitrogen dioxide.

3. The refrigerator of claim 1, wherein the fan motor assembly is driven according to the gas level detected by the gas sensor.

4. The refrigerator of claim 1, wherein the fan motor assembly is automatically start when the gas is detected by the gas sensor.

5. The refrigerator of claim 1, wherein the controller controls the fan motor assembly such that an air volume is varied based on the detection of the gas by the gas sensor.

6. The refrigerator of claim 1, wherein the door is extended higher than a height of a upper surface of the cabinet and a front surface of the purifier is shielded by the door when the door is closed, and wherein the case includes:
    an upper case having inclined surfaces on front and both side circumferences, and the inlet holes being formed on the inclined surface of the both sides of the upper case and the outlet hole being formed on the inclined surface of the front of the upper case; and
    a lower case coupled to the upper case and mounted on the upper surface of the cabinet.

7. The refrigerator of claim 1, wherein the filter assembly includes a filter that filters the carbon monoxide and nitrogen dioxide.

8. The refrigerator of claim 1, wherein the filter assembly includes a filter that filters oil mist and a filter that filters the harmful gas.

9. The refrigerator of claim 1, wherein a plurality of filter mounting ports, which is forwardly opened, is formed in the case, and wherein the plurality of filter mounting ports is shielded by the plurality of filter assemblies, which are inserted into or withdrawn from an interior of the case in a sliding manner.

10. The refrigerator of claim 1, wherein each of the plurality of filter assemblies includes:
    a filter module formed by coupling together a plurality of filters; and
    a filter case in which the filter module in a coupled state is accommodated and which is configured to be inserted into or withdrawn from an interior of the case.

11. The refrigerator of claim 1, wherein the fan motor assembly includes:
    a motor;
    a motor supporter fixed to a bottom surface of the case to support the motor;
    a fan that is rotated by the motor and suctions air in a central direction thereof to discharge the air in a circumferential direction thereof; and
    a fan guide that is coupled to the motor supporter, defines a space in which the fan is accommodated, and defines a guide suction hole through which air is introduced into the fan, and a guide discharge hole through which the air is discharged by the fan.

12. The refrigerator of claim 11, wherein a discharge air guide that connects the outlet hole and the guide discharge hole to each other to guide the discharged air is formed in the case.

13. The refrigerator of claim 1, wherein a display to display an operation state of the air purifier and a manipulation button configured to be manipulated by the user to manipulate driving of the air purifier are formed on a front surface of the case, which is configured to face the door.

14. The refrigerator of claim 13, wherein the outlet hole is formed above the display on the front surface of the case.

15. The refrigerator of claim 1, wherein a front discharge guide formed on a front inner side of the lower case and extending to a lower end of the outlet hole with a slope or round.

16. The refrigerator of claim 1, wherein magnets which are attached to an upper surface of the cabinet, which is formed of steel, by a magnetic force are provided on a bottom surface of the case.

17. The refrigerator of claim 1, further including:
a power source unit that extends to an outside of the case to supply electric power to the air purifier.

\* \* \* \* \*